US012496734B2

(12) United States Patent
McCormick et al.

(10) Patent No.: US 12,496,734 B2
(45) Date of Patent: Dec. 16, 2025

(54) DRILL FLOOR GRAFTER ROBOT

(71) Applicants: TRANSOCEAN OFFSHORE DEEPWATER DRILLING INC., Houston, TX (US); Stebbins Innovations, LLC, Houston, TX (US)

(72) Inventors: Craig McCormick, Houston, TX (US); Scott McKaig, Houston, TX (US); Brendan B. Braniff, Houston, TX (US); Kevin Jander, Houston, TX (US); Keith Boughton, Houston, TX (US); Travis McGuire, Houston, TX (US); John Martin, Houston, TX (US); James Lippold, Houston, TX (US)

(73) Assignees: TRANSOCEAN SEDCO FOREX VENTURES LIMITED, Hamilton (BM); STEBBINS INNOVATIONS, LLC, Houston, TX (US)

( * ) Notice: Subject to any disclaimer, the term of this patent is extended or adjusted under 35 U.S.C. 154(b) by 173 days.

(21) Appl. No.: 18/386,494

(22) Filed: Nov. 2, 2023

(65) Prior Publication Data
US 2024/0173869 A1    May 30, 2024

Related U.S. Application Data

(60) Provisional application No. 63/421,625, filed on Nov. 2, 2022.

(51) Int. Cl.
  *B25J 11/00*  (2006.01)
  *B25J 5/00*  (2006.01)
  *B25J 15/00*  (2006.01)

(52) U.S. Cl.
  CPC ............ *B25J 15/0019* (2013.01); *B25J 5/005* (2013.01); *B25J 11/005* (2013.01)

(58) Field of Classification Search
  CPC .......... E21B 19/14; E21B 19/20; E21B 44/00; B25J 15/0019; B25J 5/005; B25J 15/0491; B25J 11/00; B25J 15/04; B25J 11/005
  See application file for complete search history.

(56) References Cited

U.S. PATENT DOCUMENTS

| 4,987,676 A * | 1/1991 | Amorosi ............ H05K 13/0413 |
| | | 29/740 |
| 4,993,139 A * | 2/1991 | Burry .................. B25J 15/0491 |
| | | 901/41 |

(Continued)

FOREIGN PATENT DOCUMENTS

| CA | 2855105 A1 | 12/2015 |
| CN | 107298424 A | 10/2017 |

(Continued)

OTHER PUBLICATIONS

Asfour et al., ARMAR-6: A Collaborative Humanoid Robot for Industrial Environments, 2018, IEEE, p. 447-454 (Year: 2018).*

(Continued)

*Primary Examiner* — Mcdieunel Marc
(74) *Attorney, Agent, or Firm* — Panitch Schwarze Belisario & Nadel LLP

(57) ABSTRACT

A system for performing operations on a work center disposed on a drill rig floor includes a robotic system having a base disposed on a track for movement thereon, a robot arm supported on the base, and one or more end effector tools selectively attachable to an end of the robot arm. A control system has a robot controller in communication with the robotic system. The robot controller is configured to command the robotic system to enter a mode for performing a selected operation, command the robot arm to engage one of the one or more end effector tools related to the selected operation from a tool storage, command the robotic system (Continued)

to move along the track to a position adjacent to the work center, and command the robotic system to perform the selected operation at the work center using the robot arm and the engaged end effector tool.

31 Claims, 17 Drawing Sheets

(56) References Cited

U.S. PATENT DOCUMENTS

| | | | |
|---|---|---|---|
| 5,687,417 | A | 11/1997 | Furlani et al. |
| 9,272,421 | B2* | 3/2016 | Subotincic ............ B25J 15/0616 |
| 9,840,886 | B1 | 12/2017 | Gable et al. |
| 10,195,745 | B2* | 2/2019 | De Castelbajac ....... B25B 11/02 |
| 11,613,940 | B2* | 3/2023 | McKenzie ............... B25J 11/00 |
| | | | 414/22.71 |
| 12,221,840 | B2* | 2/2025 | Lindblom ................ B25J 19/02 |
| 12,291,930 | B2* | 5/2025 | Baker ..................... E21B 19/10 |
| 2009/0159294 | A1* | 6/2009 | Abdollahi ............... E21B 19/14 |
| | | | 166/77.52 |
| 2010/0025046 | A1 | 2/2010 | Francis et al. |
| 2014/0286742 | A1* | 9/2014 | Hedrick ............... B25J 15/0253 |
| | | | 414/800 |
| 2016/0201408 | A1 | 7/2016 | Little et al. |
| 2016/0312550 | A1 | 10/2016 | Jonassen |
| 2017/0314369 | A1 | 11/2017 | Rosano et al. |
| 2017/0328149 | A1 | 11/2017 | Søyland et al. |
| 2018/0021945 | A1 | 1/2018 | Pettersen et al. |
| 2018/0224029 | A1 | 8/2018 | Ruehmann et al. |
| 2018/0290250 | A1* | 10/2018 | Fitzgerald .......... B23Q 3/15536 |
| 2019/0003269 | A1 | 1/2019 | Skjærseth et al. |
| 2019/0078402 | A1 | 3/2019 | Domec et al. |
| 2019/0226287 | A1 | 7/2019 | Trydal et al. |
| 2020/0001414 | A1 | 1/2020 | Wen |
| 2021/0114151 | A1 | 4/2021 | Vornweg |
| 2022/0193903 | A1* | 6/2022 | Ingram .................... B25J 13/08 |

FOREIGN PATENT DOCUMENTS

| | | |
|---|---|---|
| CN | 107521632 A | 12/2017 |
| CN | 208005130 U | 10/2018 |
| EP | 3218568 B1 | 1/2020 |
| ES | 1139433 U | 5/2015 |
| GB | 2579556 A | 7/2020 |
| WO | 2007143842 A1 | 12/2007 |
| WO | 2009135201 A2 | 11/2009 |
| WO | 2022072019 A1 | 4/2022 |

OTHER PUBLICATIONS

Koenig et al., Gesture-Based Teleoperated Grasping for Educational Robotics, 2021, IEEE, p. 222-228 (Year: 2021).*

Cook et al., Development of a robotic device for facilitating learning by children who have severe disabilities, 2002, IEEE, p. 178-187 (Year: 2002).*

Gross, The iWROV: the intelligent future, 2005, IEEE, p. 1-7 (Year: 2005).*

Asfour et al., ARMAR-6: A Collaborative Humanoid Robot for Industrial Environments, 2008, IEEE, p. 447-454 (Year: 2008).*

Bluethmann et al., Building an autonomous humanoid tool user, 2004, IEEE, p. 402-421 (Year: 2004).*

Webpage for Robo-Spider Automate Bolting System, dated Oct. 17, 2019, retrieved online from https://www.torqlite.com/products/robo-spider-2/,2 pages.

International Search Report and Written Opinion issued by the International Searching Authority for Application No. PCT/US2021/038501, dated Sep. 13, 2021, 15 pages.

Office Action issued Dec. 7, 2021 in U.S. Appl. No. 17/402,265.

Notice of Allowance issued Mar. 23, 2022 in U.S. Appl. No. 17/402,265.

Notice of Allowance issued Jul. 20, 2022 in U.S. Appl. No. 17/402,265.

International Search Report and Written Opinion issued by the International Searching Authority for Application No. PCT/US2023/036685, dated Jan. 30, 2024.

Communication Pursuant to Rule 114(2) EPC issued Nov. 20, 2023 in European Application No. 21742267.4.

Third Party Claim Chart comparing pending claim 1 to West Drilling US Pub No. 2019/0003269, received Oct. 9, 2025.

* cited by examiner

DRILL FLOOR GRAFTER ROBOT

CROSS REFERENCE TO RELATED APPLICATIONS

This application claims priority to U.S. Provisional Patent Application No. 63/421,625, filed on Nov. 2, 2022, entitled "Drill Floor Grafter Robot,", the entire contents of which are incorporated by reference herein.

BACKGROUND

Embodiments described herein relate generally to operations performed on a drilling rig floor, and more particularly, to a robot configured to perform certain operations on the drill floor to minimize the risk of injury.

The red zone is a hazardous area on a drilling rig due to the presence of moving, heavy-duty equipment which has the capability of striking, crushing, or otherwise injuring personnel present in the red zone. Yet, personnel presence is conventionally necessary to carry out a number of tasks associated with drilling operations, including stabbing connections, installing or removing subs, bottom hole assembly (BHA) "jewelry" (e.g., roller reamers, stabilizers, mandrels, and the like), mud buckets, slips, bushings, dog collars, bales, elevators, drillpipe signal continuity test tools, hose clamps, casing tong guides, and the like, citing wireline logging cables, guiding and clamping completion cables, cleaning BHA and piping, cleaning and doping pipe, cleaning/washing the rig floor, and the like.

It is desirable to increase safety on the drill floor by automating at least some these tasks to minimize personnel presence in hazardous areas of the rig.

BRIEF SUMMARY

Briefly stated, one example embodiment of the invention comprises a system for performing one or more operations on a work center disposed on a drill rig floor. The system includes a robotic system having a base disposed on a track for movement thereon, a robot arm supported on the base, and one or more end effector tools selectively attachable to an end of the robot arm. A control system has a robot controller in communication with the robotic system. The robot controller is configured to command the robotic system to enter a mode for performing a selected operation, command the robot arm to engage one of the one or more end effector tools related to the selected operation from a tool storage, command the robotic system to move along the track to a position adjacent to the work center, and command the robotic system to perform the selected operation at the work center using the robot arm and the engaged end effector tool.

Another example embodiment comprises a system for performing one or more operations on a work center disposed on a drill rig floor. The system includes a plurality of robotic systems each having a base disposed on a track for movement thereon, a robot arm supported on the base, and one or more end effector tools selectively attachable to an end of the robot arm. A control system has a robot controller in communication with each of the plurality of robotic systems. The robot controller is configured to command at least a subset of the plurality of robotic systems to enter a mode for performing a selected operation, command at least one robot arm from the at least a subset of the plurality of robotic systems to engage one of the one or more end effector tools related to the selected operation from a tool storage, command at least one of the at least a subset of the plurality of robotic systems to move along its respective track to a position adjacent to the work center, and command the at least one of the at least a subset of the plurality of robotic systems to perform the selected operation at the work center using the at least one robot arm and the engaged end effector tool.

BRIEF DESCRIPTION OF THE SEVERAL VIEWS OF THE DRAWINGS

The following detailed description of preferred embodiments will be better understood when read in conjunction with the appended drawings. For the purpose of illustration, there are shown in the drawings embodiments which are presently preferred. It should be understood, however, that the invention is not limited to the precise arrangements and instrumentalities shown.

In the drawings.

DETAILED DESCRIPTION

Figure 1A:
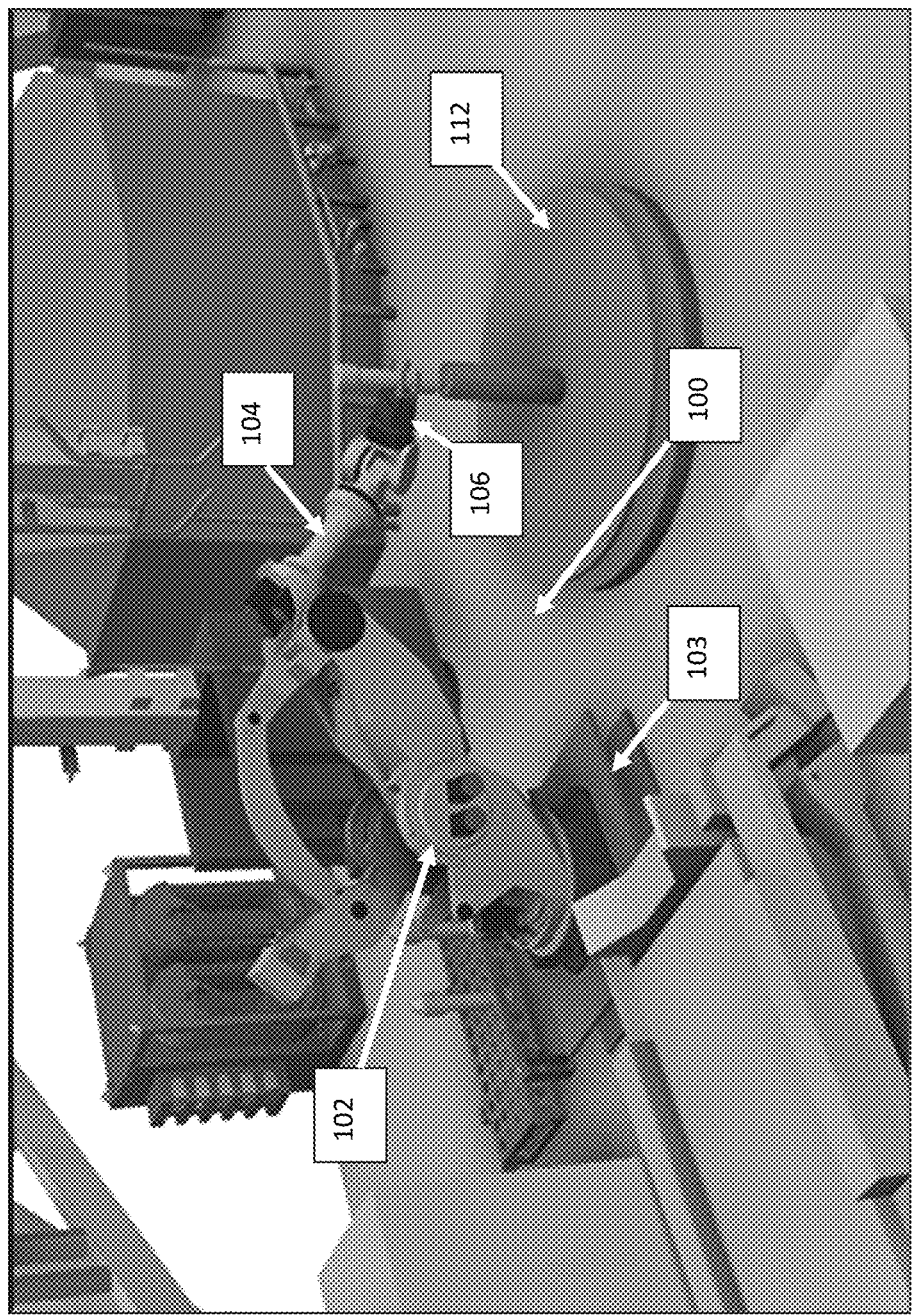
FIG. 1A is a right side perspective view of a first example embodiment of a grafter robot in use on a drill floor.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the device and designated parts thereof. The terminology includes the above-listed words, derivatives thereof, and words of similar import. Additionally, the words "a" and "an", as used in the claims and in the corresponding portions of the specification, mean "at least one."

It should also be understood that the terms "about," "approximately," "generally," "substantially" and like terms, used herein when referring to a dimension or characteristic of a component, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 1B:
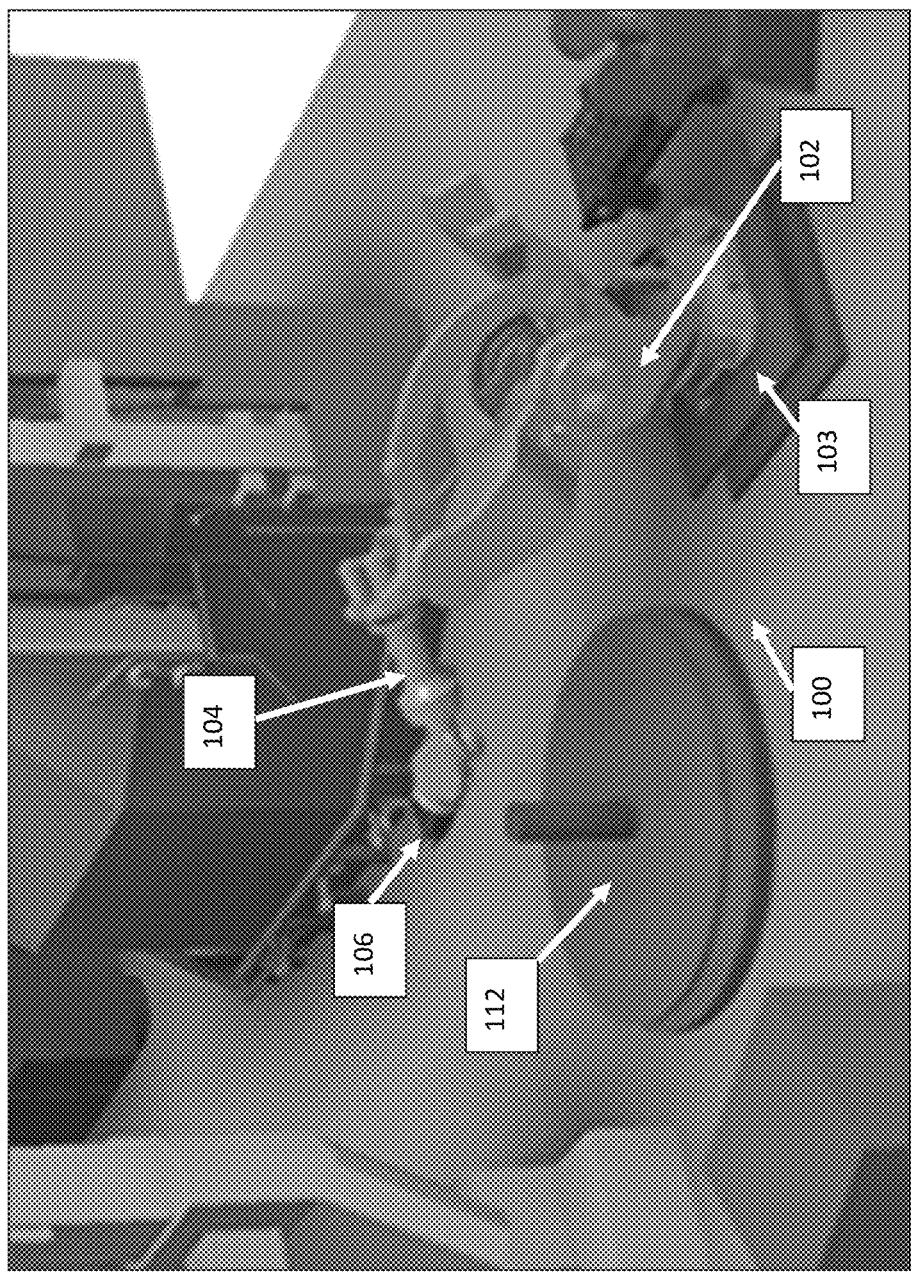
FIG. 1B is a left side perspective view of a second example embodiment of a grafter robot in use on a drill floor.
Figure 2:
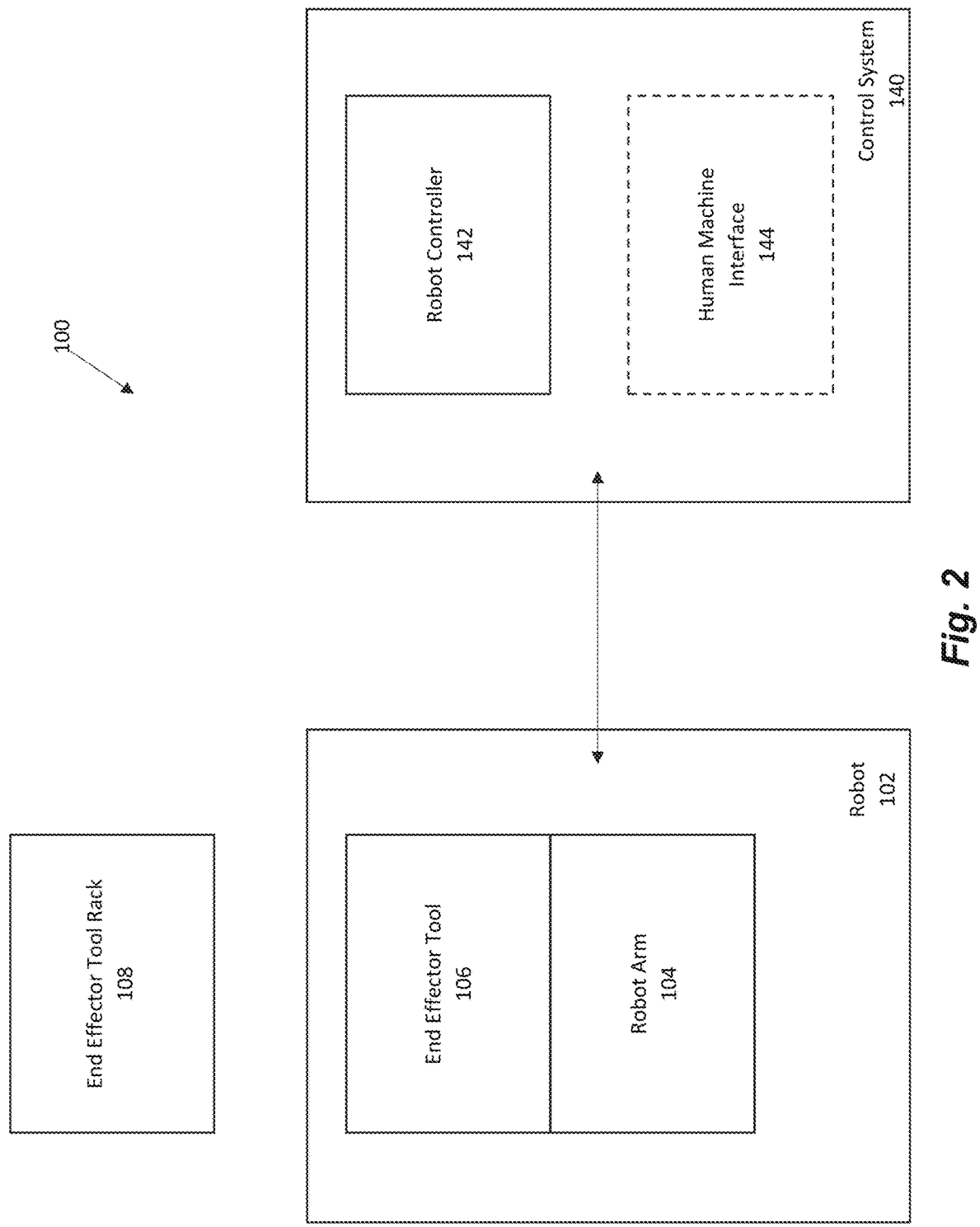
FIG. 2 is an example diagram of a system for performing drill floor operations.

FIGS. 1A, 1B, and 2 show an example of a system 100 for performing certain drill floor operations, such as those described herein, including assembly, tripping, inspection, well construction, or the like, and combinations thereof. System 100 may include a robot 102 having a base 103 and one or more robotic arms 104 supported by the base. The robotic arms preferably have at least six degrees of freedom for movement thereof. Each arm 104 may be compatible with one or more selectively attachable end effector tools 106 (e.g., a small sub end effector configured for engaging the stand and/or subs; a BHA jewelry end effector configured for engaging BHA jewelry; a mud bucket end effector configured for engaging the pipe; a slips end effector configured for engaging the pipe; a bushing end effector configured for engaging bushings; as well as end effectors for casing protectors, dog collars, bales/elevators, wired drillpipe signal continuity test tools, continuous circulation hose clamps, casing tong guides, cutting logging cable, guiding and clamping completion cables, cleaning, wiping, washing, doping, combinations thereof, and the like). End effector tools 106 may be configured for one or more of guiding, stabbing, lifting, lowering, gripping, clamping, rotating, or spinning operations, and/or may have dexterous functions. The particular functionality of a particular end effector tool 106 may be based on the specific operations for which it is used. End effector tools 106 may be stored in a tool rack 108, which may be attached to the robot 102 or installed separately on the drill floor and accessible by the arm 104 when an end effector tool 106 is needed.

The robot 102 is preferably portable for allowing deployment at different locations on the drill floor, and specifically at a work center 112, which is primarily a rotary table on the drill floor, bore hole, or the like, but may also be apparatus used in the performance of well construction. The base 103 of the robot 102 may be movable, such as being mounted to a rail for movement thereon, as explained in further detail below in conjunction with FIGS. 9-11. Other motive methods for moving the robot 102 may be employed, as well.

The system 100 may include a control system 140 that includes a robot controller 142 in communication with the robot 102 and configured to control one or more robotic arms 104 (e.g., control motions of the robotic arms, control forces exerted by robotic arms 104 on various objects, control orientations of robotic arms 104, and the like). The control system 140 may include a human machine interface 144 for allowing a human operator to control various aspects of control system 140. In an example embodiment, via human machine interface 144, the human operator may be configured to control robotic arms 104 and/or other components of the robot 102, modify software instructions of control system 140, or exercise any other type of control over the robot 102 (e.g., exercise control over functions of end effector tools 106).

While the robot may be monitored and/or operated for at least some of the steps described below by a human operator (driller), in addition or alternatively, the robot may be instructed by a drilling control layer (DCL) in the robot controller 142. A DCL may be a controller including software instructions and computing means (e.g., a processor having a memory for storing the software instructions as well as various related data needed for operating DCL) for transforming instructions for well operations into specific operational instructions for the robot. For example, DCL may generate machine-readable output for use by the robot.

In various embodiments, the DCL may be further configured to collect data associated with operations performed by the robot using one or more sensors that are placed on the robot and/or elsewhere on the rig. Sensors may be configured to collect data using any suitable means, such as optical, electrical, pressure, or audio means. For example, sensors may be optical sensors for determining positions and orientations of the robot, tool racks, various equipment upon which the robot will operate, and the like. For instance, optical sensors may include Lidar, cameras, lasers, time-of-flight devices, and combination thereof. In some cases, multiple cameras or lasers may be used to perform triangulation for determining positions and orientations of different equipment, including the end effector tool 106, tool storage 108, the work center 112, and/or other like components required for performing operations, similar to the disclosures in U.S. Pat. Nos. 11,499,383 and 11,585,932, the contents of which are incorporated by reference herein. Such optical sensors may also be used for visual inspection, e.g., verifying component placement, checking for defects, locating objects of interest, and the like. Alternatively, sensors may be sensors utilizing sound waves (e.g., ultrasound) for determining distances to various surfaces of the equipment and the like. Sensors can also be used to locate and/or verify components. For example, the robot 102 may include an RFID reader and end effector tools 106 and/or other components to be engaged by the robot may include RFID tags providing identifying information. The RFID reader may be used to scan the RFID tag to verify the component is correct for the selected operation prior to engagement. Other similar techniques can include optical tag reading, near field communication, wireless data transfer, or the like. Sensors may also be used to detect pressures, torques, rotation, or the like as equipment is engaged by the robot and operated upon to perform tasks on the drill floor. For example, a sensor may be used to determine that rotation of BHA jewelry has been completed to appropriate orientation and tightness. Data may be interpreted by DCL to appropriately control subsequent actions by the robot or cease operations and/or raise an alarm as to malfunctions, or the like. Data may also or alternatively be communicated to external controllers or processors for storage, analysis, or the like. Operation of the robot 102 may be automated, similar to the techniques described in U.S. patent application Ser. No. 18/029,307, which is incorporated by reference herein.

Figure 3A:
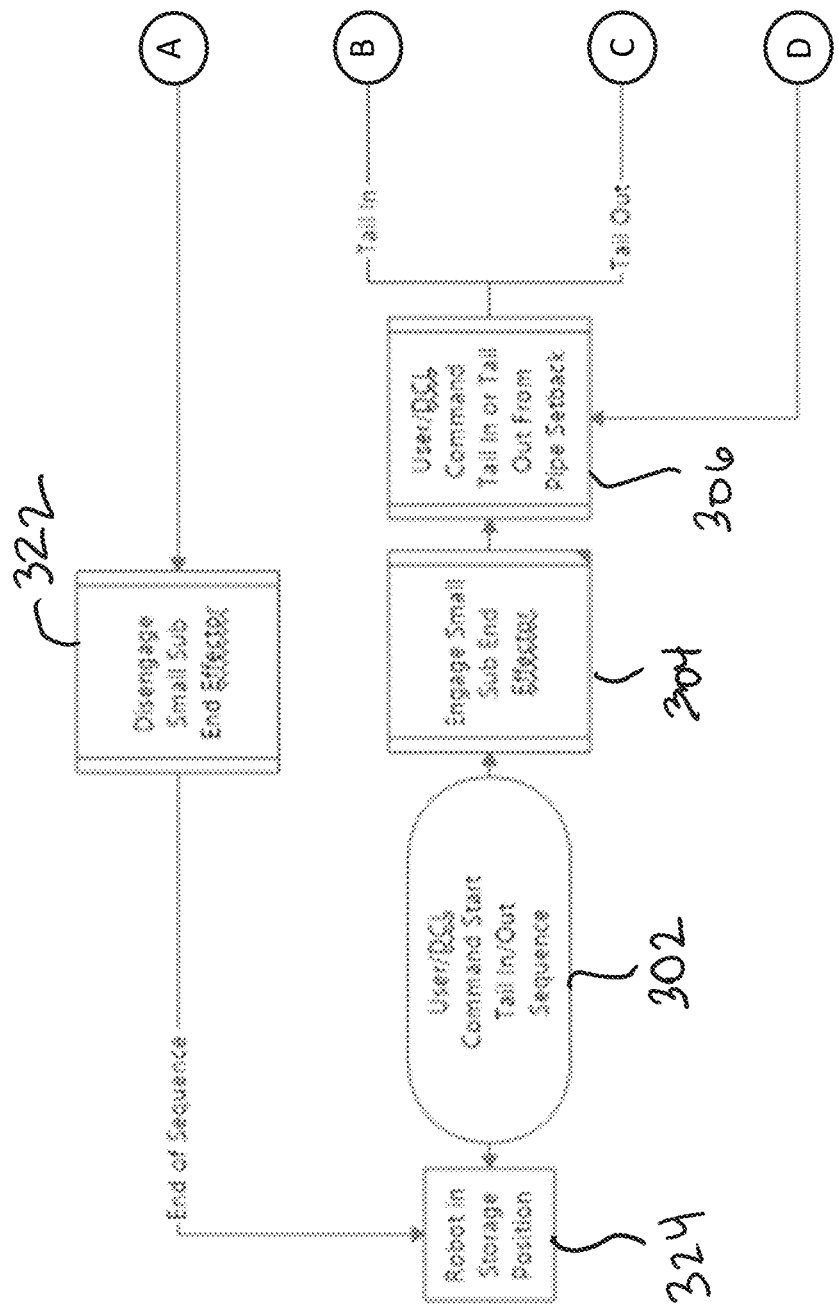
FIGS. 3A-3B constitute a flowchart representing example methods executed by the grafter robot for tailing in from or tailing out to a pipe setback stand and stabbing pipe connections.
Figure 3B:
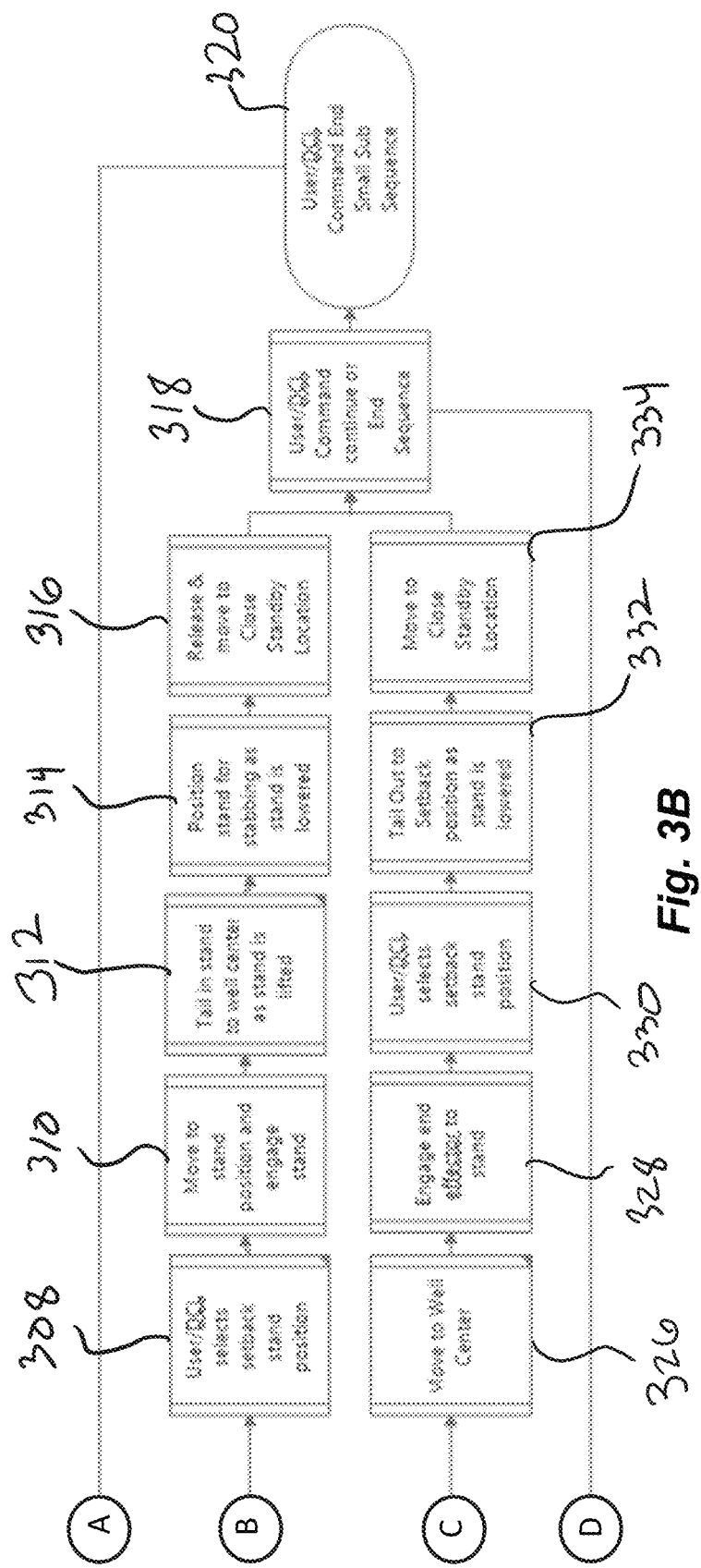

For the example method shown in FIGS. 3A-3B, the rig is ready to trip into the hole with drill pipe. The robot 102, which may initially be in a storage or resting position, may be commanded at to "Tail In/Out Stand" mode by the driller or DCL. The robot 102 may engage the small sub end effector 106 from the end effector tool rack 108 and move to a close standby position adjacent to work center 112. The driller or DCL may select "Tail-In From Pipe Setback". The driller or DCL may select the setback stand position number. The robot 102 may move to the stand position and engage the end effector 106 to the stand. As the stand is lifted by the traveling equipment, the robot 102 may tail in the stand to the work center 112. Once in position directly over the drill string, the travelling equipment may lower the stand to stab the connection. The robot 102 may be commanded by the driller or DCL to disengage the end effector 106 from the pipe and move back to the close standby position. This sequence may continue until the trip is complete, at which point the robot 102 may return the end effector 106 to the end effector tool rack 108 and may enter the robot storage position. Note that variations of the above-recited steps may be performed in parallel or a different sequential order than given above, and some steps may be omitted entirely as necessary. For example, the driller or DCL may select "Tail In From Pipe Setback" before the robot 102 moves to the close standby position. Other like variations are possible within the scope of the invention.

The trigger for this program may be the requirement of a pipe trip into the hole. Preconditions to this method may include that the robot 102 is in the storage position and the rig is prepared to trip in the hole with pipe. Post-conditions for this method may include that the robot 102 has returned to the storage position and the rig has been tripped in the hole with pipe.

A first example sequence for a tail in operation is described below in conjunction with FIGS. 3A-3B:

- 302: The robot 102 may be commanded to "Tail In/Out Stand" mode by the driller or DCL.
- 304: The robot 102 may engage the small sub end effector 106 from the end effector tool rack 108.
- 306: The driller or DCL may select "Tail-In From Pipe Setback".
- 308: The driller or DCL may select the setback stand position number.
- 310: The robot 102 may move to the stand position and engage the end effector 106 to the stand.
- 312: As the stand is lifted by the traveling equipment, the robot 102 may tail in the stand to the work center 112.
- 314: Once in position directly over the drill string, the travelling equipment (not shown) may lower the stand to stab the connection. The robot 102 may position the stand for stabbing.
- 316: The robot 102 at this point may be commanded by the driller or DCL to disengage the end effector 106 from the pipe and move back to the close standby position.
- 318: The sequence may continue, for example by returning to step 306 or the like, until the trip is complete.
- 320: When the trip is complete, the robot 102 may be commanded to end the sequence.
- 322: Upon ending the sequence, the robot 102 may return the end effector 106 to the end effector tool rack 108.
- 324: The robot 102 may enter the robot storage position. The various steps described above may be performed in different order than listed, including parallel performance of certain steps, and other steps may be omitted as necessary.

A second example sequence for a tail-out operation is described below in further conjunction with FIGS. 3A-3B:

- 302: The robot 102 may be commanded at step 302 to "Tail In/Out Stand" mode by the driller or DCL.
- 304: The robot 102 may engage the small sub end effector 106 from the end effector tool rack 108.
- 306: The driller or DCL may select "Tail-Out To Pipe Setback".
- 326: The robot 102 may move to the work center 112.
- 328: The robot 102 may engage the end effector 106 to the stand.
- 330: The driller or DCL may select the setback stand position number.
- 332: As the stand is lifted to clear the drillstring and lowered by the traveling equipment, the robot 102 may tail out the stand to the setback position. Once in position directly at the setback position, the travelling equipment lowers the stand to the setback.
- 334: The robot 102 may be commanded by the driller or DCL to disengage the end effector 106 from the stand and move back to the close standby position.
- 318: The sequence may continue, for example by returning to step 306 or the like, until the trip is complete.
- 320: When the trip is complete, the robot 102 may be commanded to end the sequence,
- 322: Upon ending the sequence, the robot 102 may return the end effector 106 to the end effector tool rack 108.
- 324: The robot 102 may enter the robot storage position. The various steps described above may be performed in different order than listed, including parallel performance of certain steps, and other steps may be omitted as necessary. In addition, although the trip-in and trip-out operations are shown in FIGS. 3A and 3B as being implemented in a single program from which either operation may be selected, the trip-in and trip-out programs may be implemented separately, in which case various steps recited above may be altered or omitted as necessary.

Figure 4A:
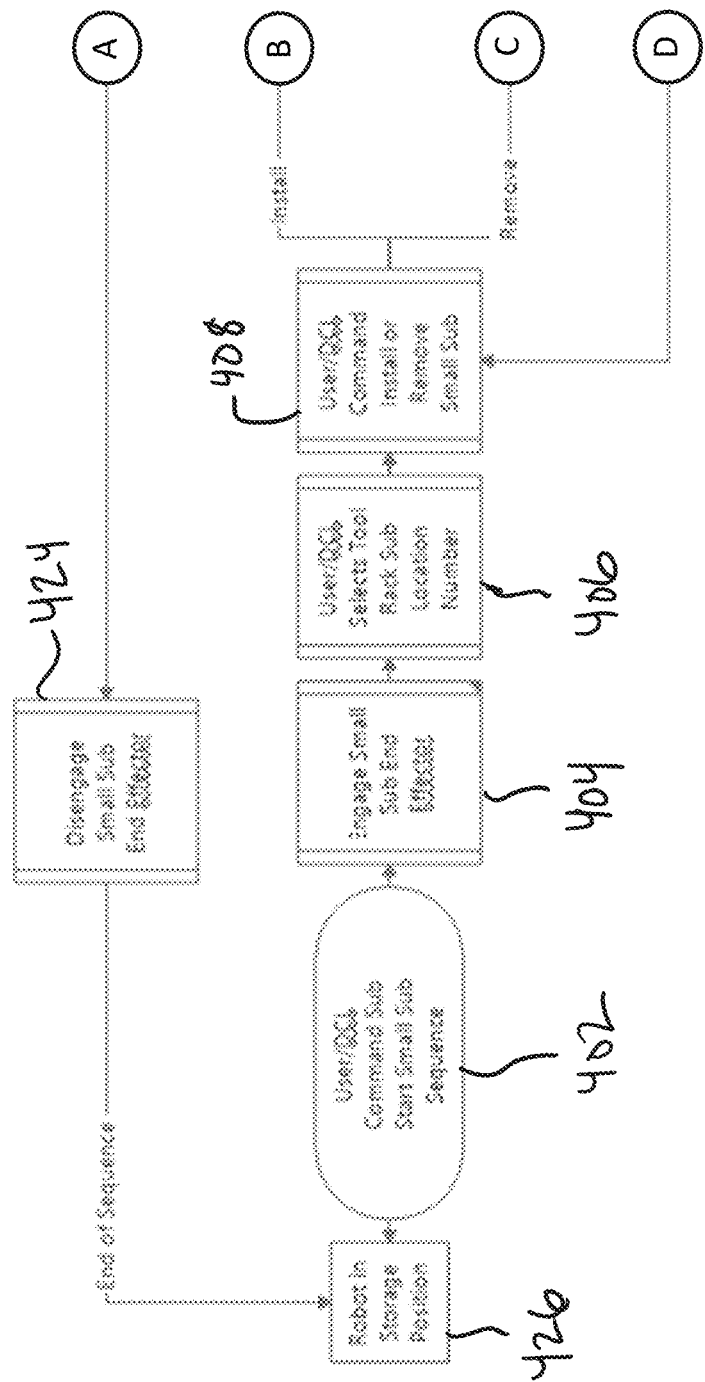
FIGS. 4A-4B constitute a flowchart representing example methods executed by the grafter robot for installing or removing small diameter subs.
Figure 4B:
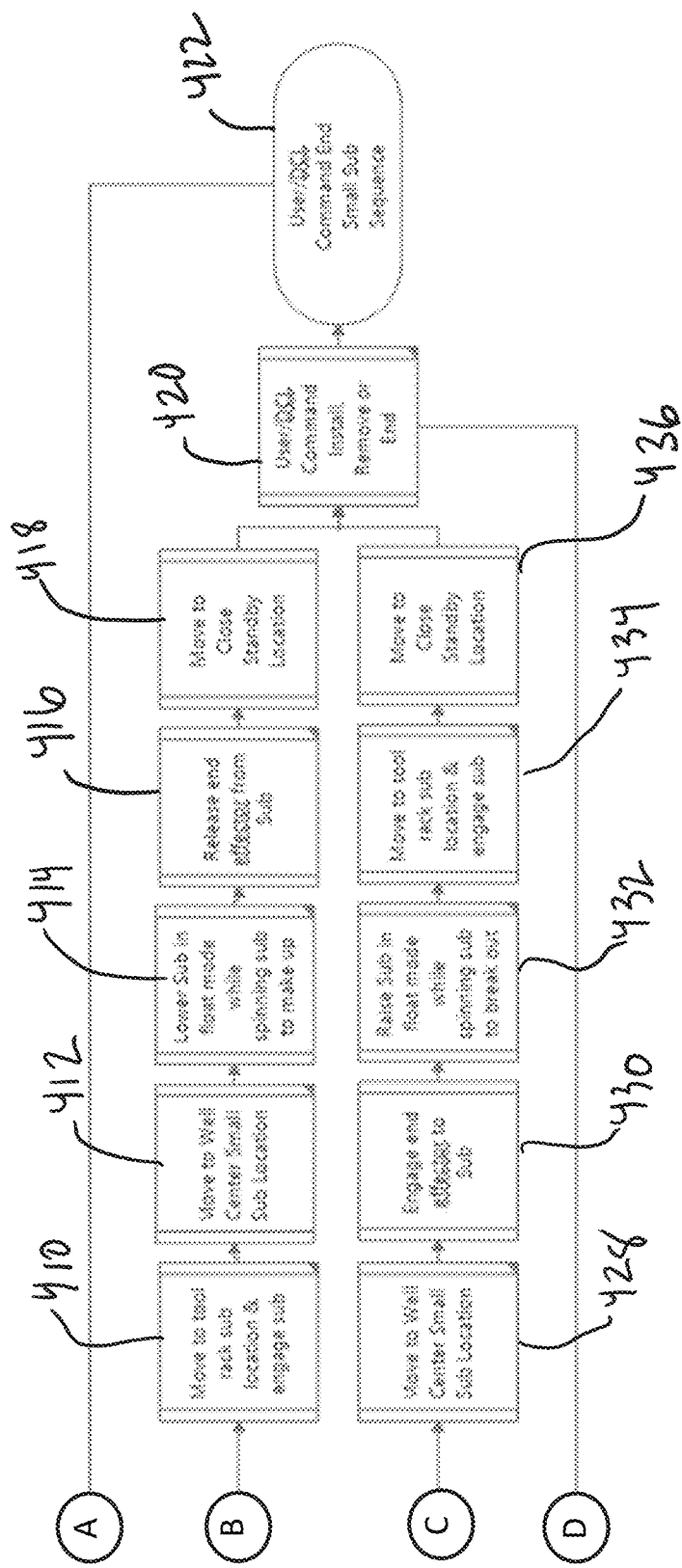

For the example method shown in FIGS. 4A-4B, the rig requires a small diameter sub to be removed or installed to the drillstring. The robot 102 may be commanded to "Small Sub" mode by the driller or DCL. The robot 102 may engage the small sub end effector 106 from the end effector tool rack 108. The driller or DCL may select the tool rack sub location number and command the robot 102 to install the sub. The robot 102 may move to the selected sub and engage the end effector 106. The robot 102 may lift the sub and move to the work center 112 small sub location. The robot 102 may enter float mode and lower the sub while spinning to the right to engage the threads. The robot 102 may release from the sub and move to the close standby location. The driller or DCL may command the robot 102 to either remove the subs (see alternate sequence) or end the sequence. The robot 102 may return the small sub end effector 106 to the end effector tool rack 108 and may enter the robot storage position. Note that various of the above-recited steps may be performed in parallel or a different sequential order than given above, and some steps may be omitted entirely as necessary. For example, the robot 102 may forego entering the robot storage position if the robot 102 is needed to perform additional tasks or must move to a different area of the drill floor. Other like variations are possible within the scope of the invention.

The trigger for this program may be the requirement of a small sub to be installed or removed from the string. Preconditions to this method may include that the robot 102 is in the storage position and the rig is ready to install or remove a small diameter sub. Post-conditions for this method may include that the robot 102 has returned to the storage position and the rig has installed or removed a small diameter sub.

A first example sequence for a small sub installation operation is described below in conjunction with FIGS. 4A-4B:

- 402: The robot 102 may be commanded to "Small Sub" mode by the driller or DCL.
- 404: The robot 102 may engage the small sub end effector 106 from the end effector tool rack 108.
- 406: The driller or DCL may select the tool rack sub location number.

408: The driller or DCL may command the robot 102 to install the sub.
410: The robot 102 may move to the selected sub and engage the end effector 106.
412: The robot 102 may lift the sub and move to the work center 112 small sub location.
414: The robot 102 may enter float mode and lower the sub while spinning to the right.
416: The robot 102 may release from the sub.
418: The robot 102 may move to the close standby location.
420: The driller or DCL may command the robot 102 to return to step 408 for selecting to install or remove a sub.
422: Otherwise, the driller or DCL may command the robot 102 to end the sequence.
424: Upon ending the sequence, the robot 102 may return the small sub end effector 106 to the end effector tool rack 108.
426: The robot 102 may enter the robot storage position. The various steps described above may be performed in different order than listed, including parallel performance of certain steps, and other steps may be omitted as necessary.

A second example sequence for removing a small sub is described below in further conjunction with FIGS. 4A-4B:
402: The robot 102 may be commanded to "Small Sub" mode by the driller or DCL.
404: The robot 102 may engage the small sub end effector 106 from the end effector tool rack 108.
406: The driller or DCL may select the tool rack sub location number.
408: The driller or DCL may command the robot 102 to remove the sub.
428: The robot 102 may move to the work center 112 small sub location
430: The robot 102 may engage the end effector 106 to the small sub.
432: The robot 102 may enter float mode and raise the sub while spinning to the left.
434: The robot 102 may lift the sub, move to the small sub location on the tool rack, and release the sub.
436: The robot 102 may move to the close standby location.
420: The driller or DCL may command the robot 102 to return to step 408 for selecting to install or remove a sub.
422: Otherwise, the driller or DCL may command the robot 102 to end the sequence.
424: Upon ending the sequence, the robot 102 may return the small sub end effector 106 to the end effector tool rack 108.
426: The robot 102 may enter the robot storage position. The various steps described above may be performed in different order than listed, including parallel performance of certain steps, and other steps may be omitted as necessary. In addition, although the small sub install and removal operations are shown in FIGS. 4A and 4B as being implemented in a single program from which either operation may be selected, the small sub install and removal programs may be implemented separately, in which case various steps recited above may be altered or omitted as necessary.

Figure 5A:
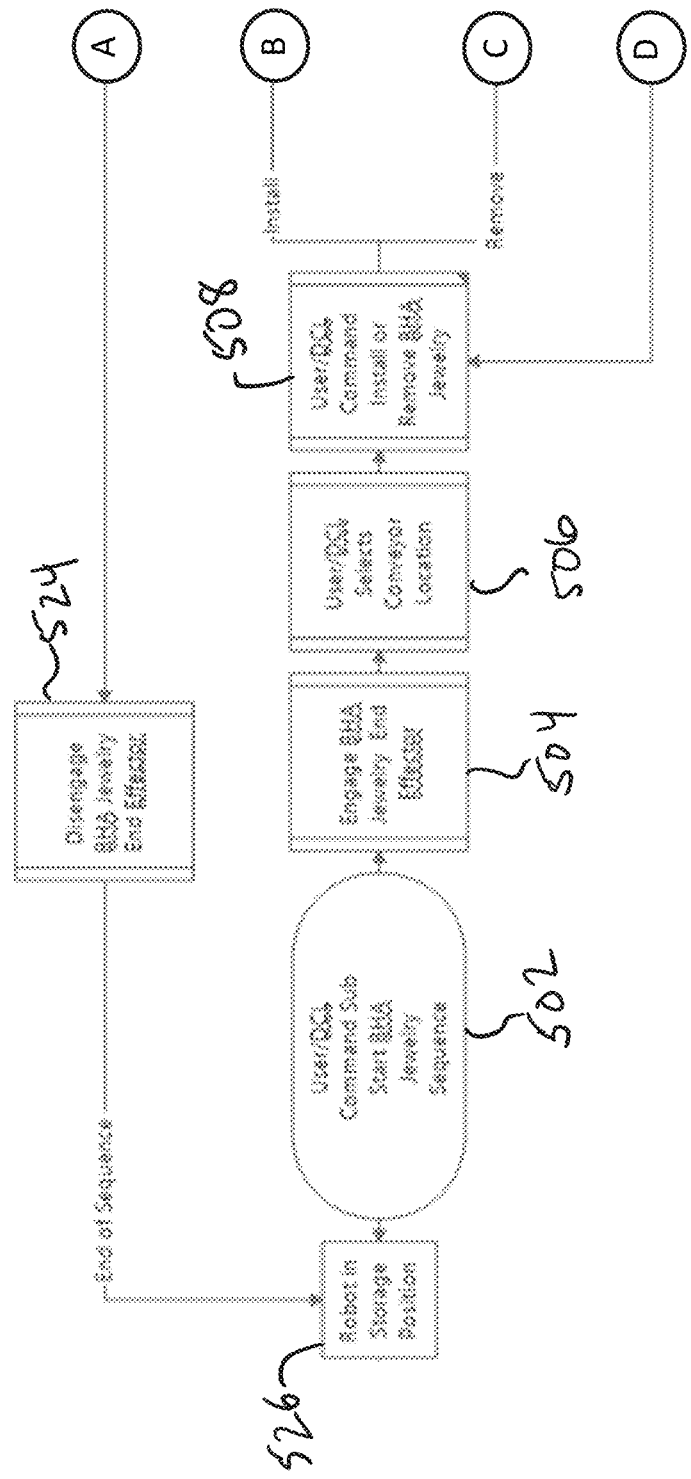
FIGS. 5A-5B constitute a flowchart representing example methods executed by the grafter robot for removing or installing BHA jewelry.
Figure 5B:
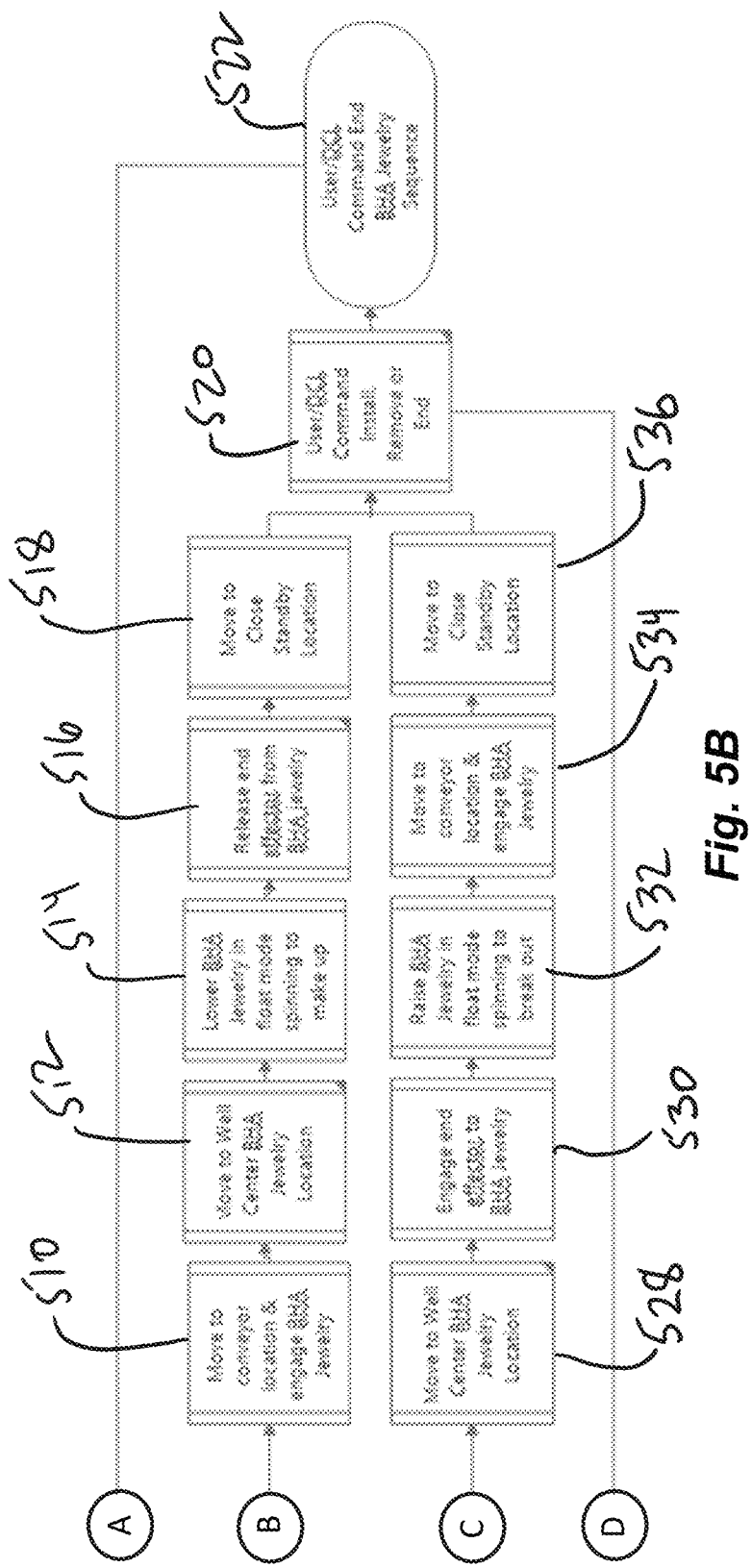

For the example method shown in FIGS. 5A-5B, the rig requires BHA jewelry to be removed or installed to the BHA. The robot 102 may be commanded to "BHA Jewelry" mode by the driller or DCL. The robot 102 may engage the BHA jewelry end effector 106 from the end effector tool rack 108. The driller or DCL may select the conveyor location and command the robot 102 to install the BHA jewelry. The robot 102 may move to the conveyor and engage the end effector 106. The robot 102 may lift the BHA jewelry and move to the work center BHA jewelry location. The robot 102 may enter float mode and lower the BHA jewelry while spinning to the right to engage the threads. The robot 102 may release from the BHA jewelry and move to the close standby location. The driller or DCL may command the robot 102 to either remove the BHA jewelry (see alternate sequence) or end the sequence. The robot 102 may return the BHA jewelry end effector 106 to the end effector tool rack 108 and enter the robot storage position. Note that various of the above-recited steps may be performed in parallel or a different sequential order than given above, and some steps may be omitted entirely as necessary.

The trigger for this program may be the requirement for BHA jewelry to be installed or removed from the drillstring. Preconditions to this method may include that the robot 102 is in the storage position and the rig is ready to install or remove BHA jewelry. Post-conditions for this method may include that the robot 102 has returned to the storage position and the rig has installed or removed BHA jewelry.

A first example sequence for installing BHA jewelry is described below in conjunction with FIGS. 5A-5B:
502: The robot 102 may be commanded to "BHA Jewelry" mode by the driller or DCL.
504: The robot 102 may engage the BHA jewelry end effector 106 from the end effector tool rack 108.
506: The driller or DCL may select the conveyor location.
508: The driller or DCL may command the robot 102 to install the BHA jewelry.
510: The robot 102 may move to the conveyor and engage the end effector 106 to the BHA jewelry.
512: The robot 102 may lift the BHA jewelry and move to the work center 112 BHA jewelry location.
514: The robot 102 may enter float mode and lower the BHA jewelry while spinning to the right to engage the threads.
516: The robot 102 may release from the BHA jewelry
518: The robot 102 may move to the close standby location.
520: The driller or DCL may commands the robot to return to step 508 for selecting to install or remove BHA jewelry.
522: Otherwise, the driller or DCL may command the robot 102 to end the sequence.
524: The robot 102 may return the BHA jewelry end effector 106 to the end effector tool rack 108.
526: The robot 102 may enter the robot storage position. The various steps described above may be performed in different order than listed, including parallel performance of certain steps, and other steps may be omitted as necessary.

A second example sequence for removing BHA jewelry is described below in further conjunction with FIGS. 5A-5B:
502: The robot 102 may be commanded to "BHA Jewelry" mode by the driller or DCL.
504: The robot 102 may engage the BHA jewelry end effector 106 from the end effector tool rack 108.
506: The driller or DCL may select the conveyor location.
508: The driller or DCL may command the robot 102 to remove the BHA jewelry.
528: The robot 102 may move to the work center 112 BHA jewelry location 530: The robot 102 may engage the end effector 106 to the BHA jewelry.

532: The robot 102 may enter float mode and raise the BHA jewelry while spinning to the left.

534: The robot 102 may lift the BHA jewelry and move to the conveyor location and release the BHA jewelry.

536: The robot 102 may move to the close standby location.

520: The driller or DCL may commands the robot to return to step 508 for selecting to install or remove BHA jewelry.

522: Otherwise, the driller or DCL may command the robot 102 to end the sequence.

524: The robot 102 may return the BHA jewelry end effector 106 to the end effector tool rack 108.

526: The robot 102 may enter the robot storage position. The various steps described above may be performed in different order than listed, including parallel performance of certain steps, and other steps may be omitted as necessary. In addition, although the BHA jewelry install and removal operations are shown in FIGS. 5A and 5B as being implemented in a single program from which either operation may be selected, the BHA jewelry install and removal programs may be implemented separately, in which case various steps recited above may be altered or omitted as necessary.

Figure 6:
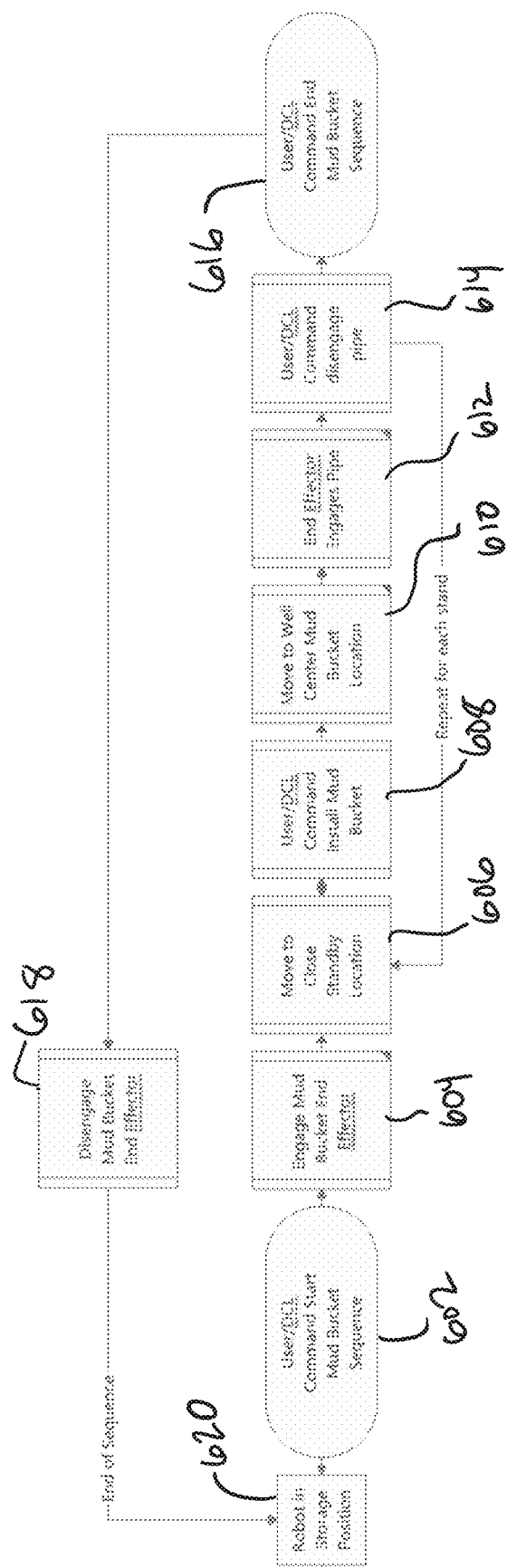
FIG. 6 is a flowchart representing an example method executed by the grafter robot for operating a mud bucket.

For the example method shown in FIG. 6, the rig is ready to wet trip out of the hole with drill pipe. The robot 102 may be commanded to "Mud Bucket" mode by the driller or DCL. The robot 102 may engage the mud bucket end effector 106 from the end effector tool rack 108 and move to the close standby position adjacent to the work center 112. When a stand of drill pipe is pulled from the hole and the connection is broken by the iron roughneck, the driller or DCL may command the robot 102 to install the mud bucket to the pipe. The robot 102 may move to the work center 112 mud bucket location and the end effector 106 engages the pipe. The pipe stand is raised by the pipe racker and the mud bucket directs mud back into the flowline. The robot 102 may be commanded by the driller or DCL to disengage the end effector 106 from the pipe and move back to the close standby position. This sequence may continue until the trip is complete, at which point the robot 102 may return the mud bucket end effector 106 to the end effector tool rack 108 and enter the robot storage position.

The trigger for this program may be the requirement that the rig wet trip pipe out of the hole. Preconditions to this method may include that the robot 102 is in the storage position and the rig is prepared to wet trip out of the hole with pipe. Post-conditions for this method may include that the robot 102 has returned to the storage position and the rig has wet tripped out of the hole with pipe.

An example sequence for a mud bucket operation is described below in conjunction with FIG. 6:

602: The robot 102 may be commanded to "Mud Bucket" mode by the driller or DCL.

604: The robot 102 may engage the mud bucket end effector 106 from the end effector tool rack 108.

606: The robot 102 may move to the close standby position adjacent to the work center 112.

608: When the iron roughneck breaks the drillpipe connection, the driller or DCL may command the robot 102 to install the mud bucket to the pipe connection.

610: The robot 102 may move to the work center 112 mud bucket location.

612: The robot 102 may engage the mud bucket end effector 106 to the pipe. The pipe is raised to disengage the pin from the box by the pipe racker and mud is directed through the mud bucket back into the flowline.

614: Once that process is completed, the robot 102 may be commanded by the driller or DCL to disengage the end effector 106 from the pipe and move back to the close standby position at step 606 to continue the sequence from steps 606-614 until the trip is complete.

616: The driller or DCL may command the robot 102 to end the mud bucket sequence.

618: Upon ending the sequence, the robot 102 may return the mud bucket end effector 106 to the end effector tool rack 108.

620: The robot 102 may enter the robot storage position. The various steps described above may be performed in different order than listed, including parallel performance of certain steps, and other steps may be omitted as necessary.

Figure 7A:
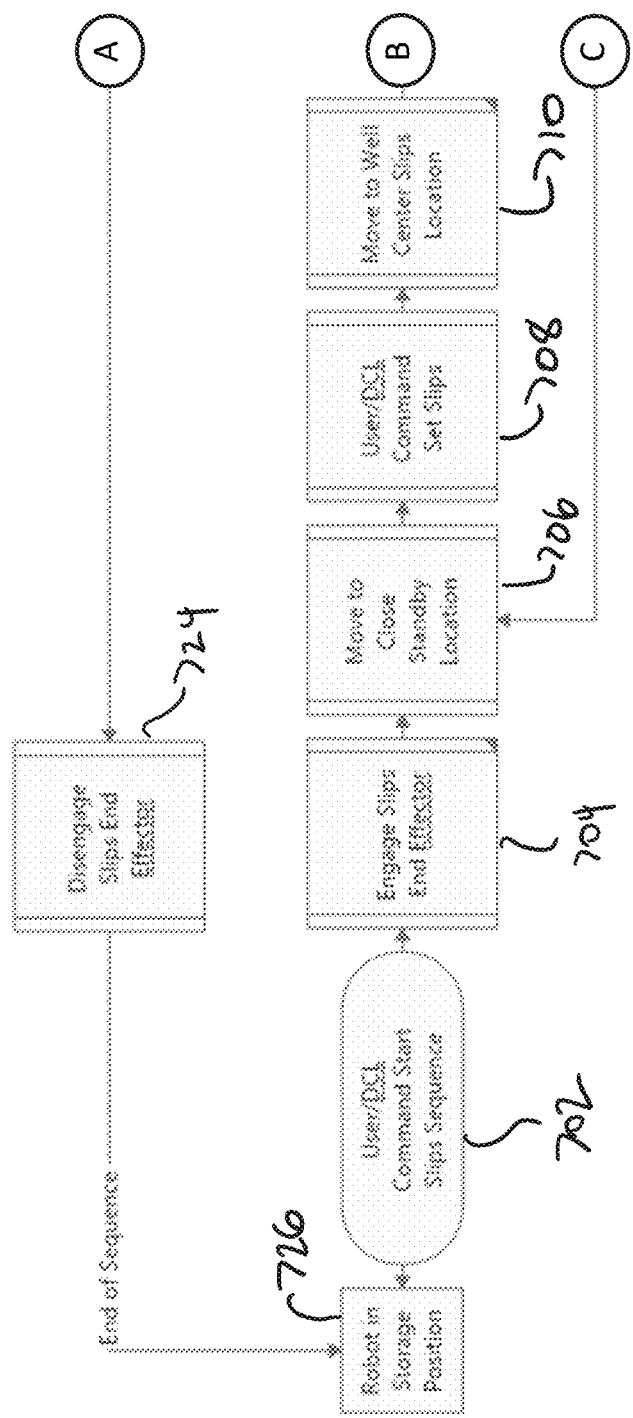
FIGS. 7A-7B constitute a flowchart representing an example method executed by the grafter robot for setting slips.
Figure 7B:
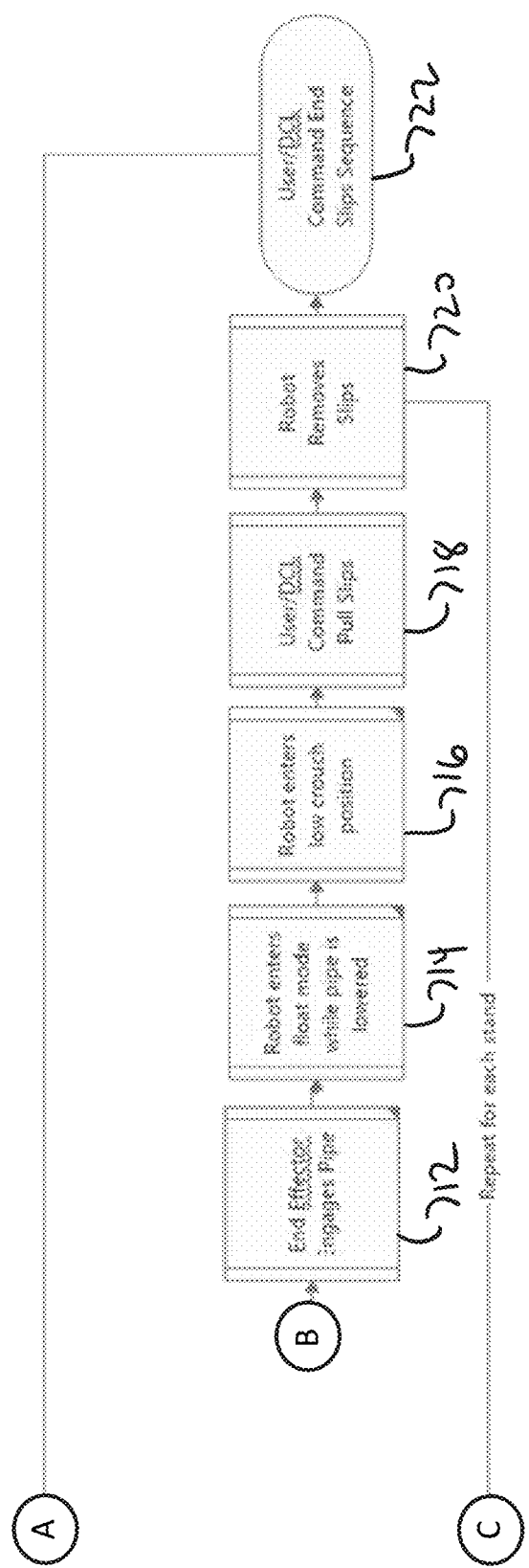

For the example method shown in FIGS. 7A-7B, the rig is ready to trip with drill pipe. The robot 102 may be commanded to "Slips" mode by the driller or DCL. The robot 102 may engage the slips end effector 106 from the end effector tool rack 108 and move to the close standby position adjacent to the work center 112. When a stand of drill pipe is ready to have the slips set, the driller or DCL may command the robot 102 to set the slips to the pipe string. The robot 102 may move to the work center 112 slips location and the end effector 106 engages the pipe. The robot 102 may enter float mode so as to be compliant as the drill string is lowered to fully set the slips. The string is lowered by the travelling assembly controlled by the driller or DCL. The robot 102 may move to a low crouch position to be clear of other equipment as the next stand is made or broken from the string. The robot 102 may be commanded by the driller or DCL to pull the slips end effector 106 from the pipe and move back to the close standby position. This sequence continues until the trip is complete, at which point the robot 102 may return the slips end effector 106 to the end effector tool rack 108 and enter the robot storage position. Note that various of the above-recited steps may be performed in parallel or a different sequential order than given above, and some steps may be omitted entirely as necessary.

The trigger for this program may be the requirement that the rig trip in or out of the hole with pipe. Preconditions to this method may include that the robot 102 is in the storage position and the rig is prepared to trip in or out of the hole with pipe. Post-conditions for this method may include that the robot 102 has returned to the storage position and the rig has tripped in or out of the hole with pipe.

An example sequence for slips operation is described below in conjunction with FIGS. 7A-7B:

702: The robot 102 may be commanded to "Slips" mode by the driller or DCL.

704: The robot 102 may engage the slips end effector 106 from the end effector tool rack 108.

706: The robot 102 may move to the close standby position adjacent to the work center 112.

708: The driller or DCL may command the robot 102 to set the slips to the pipe string.

710: The robot 102 may move to the work center 112 slips location

712: The robot 102 may engage the end effector 106 to the pipe.

714: The robot 102 may enter float mode while the drill string is lowered by the travelling assembly.

716: The robot 102 may move to a low crouch position.

718: The robot 102 may be commanded by the driller or DCL to pull the slips end effector 106 from the pipe.

720: The robot 102 may remove the slips and may move back to the close standby position. The sequence from steps 706-720 may be repeated until the trip is complete.

722: The driller or DCL may command the robot 102 to end the sequence.

724: Upon ending the sequence, the robot 102 may return the slips end effector 106 to the end effector tool rack 108.

726: The robot 102 may enter the robot storage position. The various steps described above may be performed in different order than listed, including parallel performance of certain steps, and other steps may be omitted as necessary.

Figure 8A:
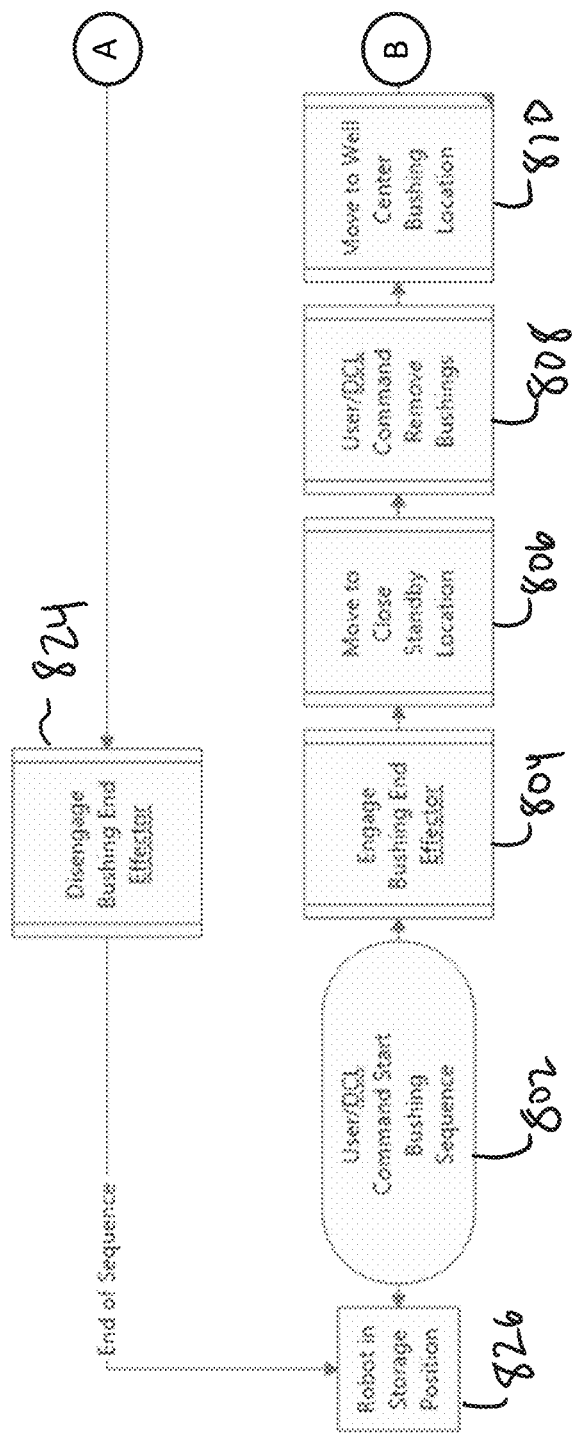
FIGS. 8A-8B constitute a flowchart representing an example method executed by the grafter robot for removing bushings.
Figure 8B:
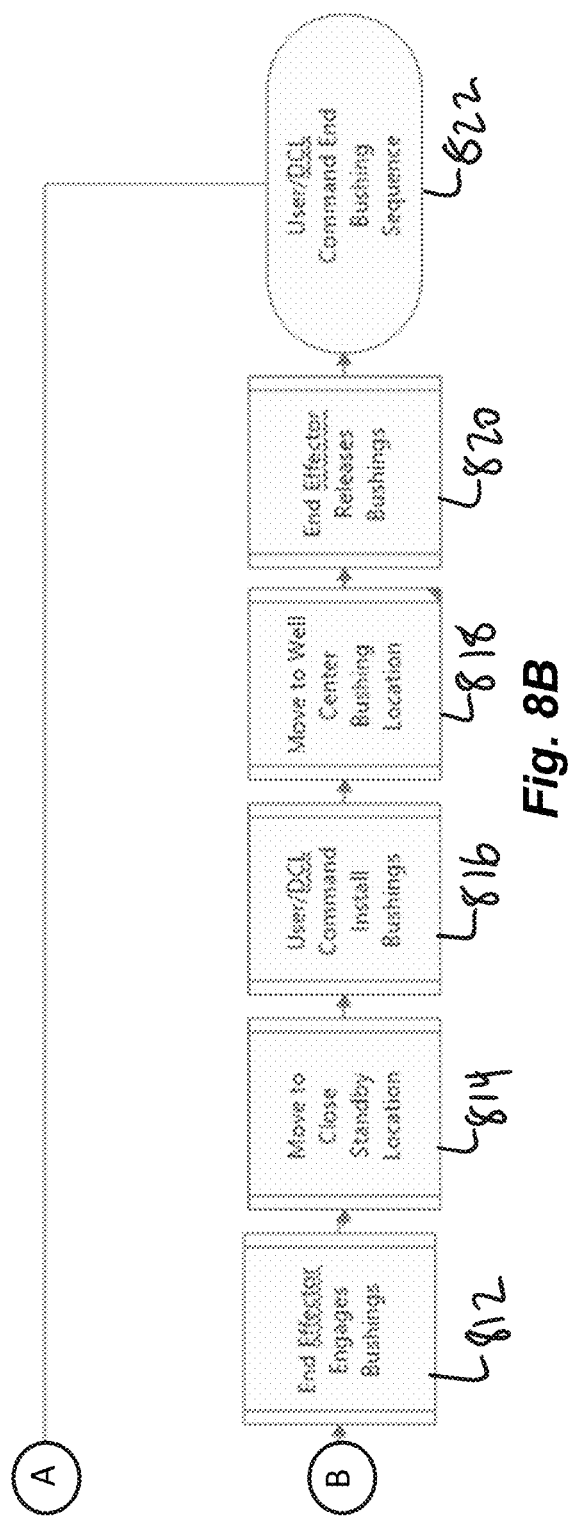

For the example method shown in FIGS. 8A-8B, the rig may require bushings to be removed and reinstalled to the rotary table to permit a large diameter bit or tool to pass through. The robot 102 may be commanded to "Bushing" mode by the driller or DCL. The robot 102 may engage the bushing end effector 106 from the end effector tool rack 108 and move to the close standby position adjacent to the work center. When ready to remove the bushings, the driller or DCL may command the robot 102 to remove the bushings from the rotary table. The robot may move to the work center 112 bushings location and the end effector 106 may engage the bushings. The robot 102 may lift the bushings clear of the rotary table and move to the close standby location. The bit or tool may be passed through the rotary table. The robot 102 may be commanded by the driller or DCL to install the bushings and the robot may lift the bushings into position in the rotary table. The bushings may be released and the robot 102 may return the bushings end effector 106 to the end effector tool rack 108 and enter the robot storage position. Note that various of the above-recited steps may be performed in parallel or a different sequential order than given above, and some steps may be omitted entirely as necessary.

The trigger for this program may be the requirement that bushings be removed. Preconditions to this method may include that the robot 102 is in the storage position and the rig is prepared to pass a large diameter bit or tool through the rotary table. Post-conditions for this method may include that the robot 102 has returned to the storage position and the rig has passed the large diameter bit or tool through the rotary table.

An example bushing operation sequence is described below in conjunction with FIGS. 8A-8B:

802: The robot 102 may be commanded to "Bushing" mode by the driller or DCL.

804: The robot 102 may engage the bushing end effector 106 from the end effector tool rack 108.

806: The robot 102 may move to the close standby position adjacent to the work center 112.

808: The driller or DCL may command the robot 102 to remove the bushings from the rotary table.

810: The robot 102 may move to the work center 112 bushings location.

812: The robot 102 may engage the end effector 106 to the bushings.

814: The robot 102 may lift the bushings clear of the rotary table and move to the close standby location.

816: After the bit or tool is passed through the rotary table, the robot 102 may be commanded by the driller or DCL to install the bushings.

818: The robot 102 may return the work center 112 bushings location and lift the bushings into position in the rotary table.

820: The robot 102 may release the bushings.

822: The driller or DCL may command the robot 102 to end the sequence.

824: Upon ending the sequence, the robot 102 may return the bushings end effector 106 to the end effector tool rack 108.

826: The robot 102 may enter the storage position. The various steps described above may be performed in different order than listed, including parallel performance of certain steps, and other steps may be omitted as necessary.

Figure 9:
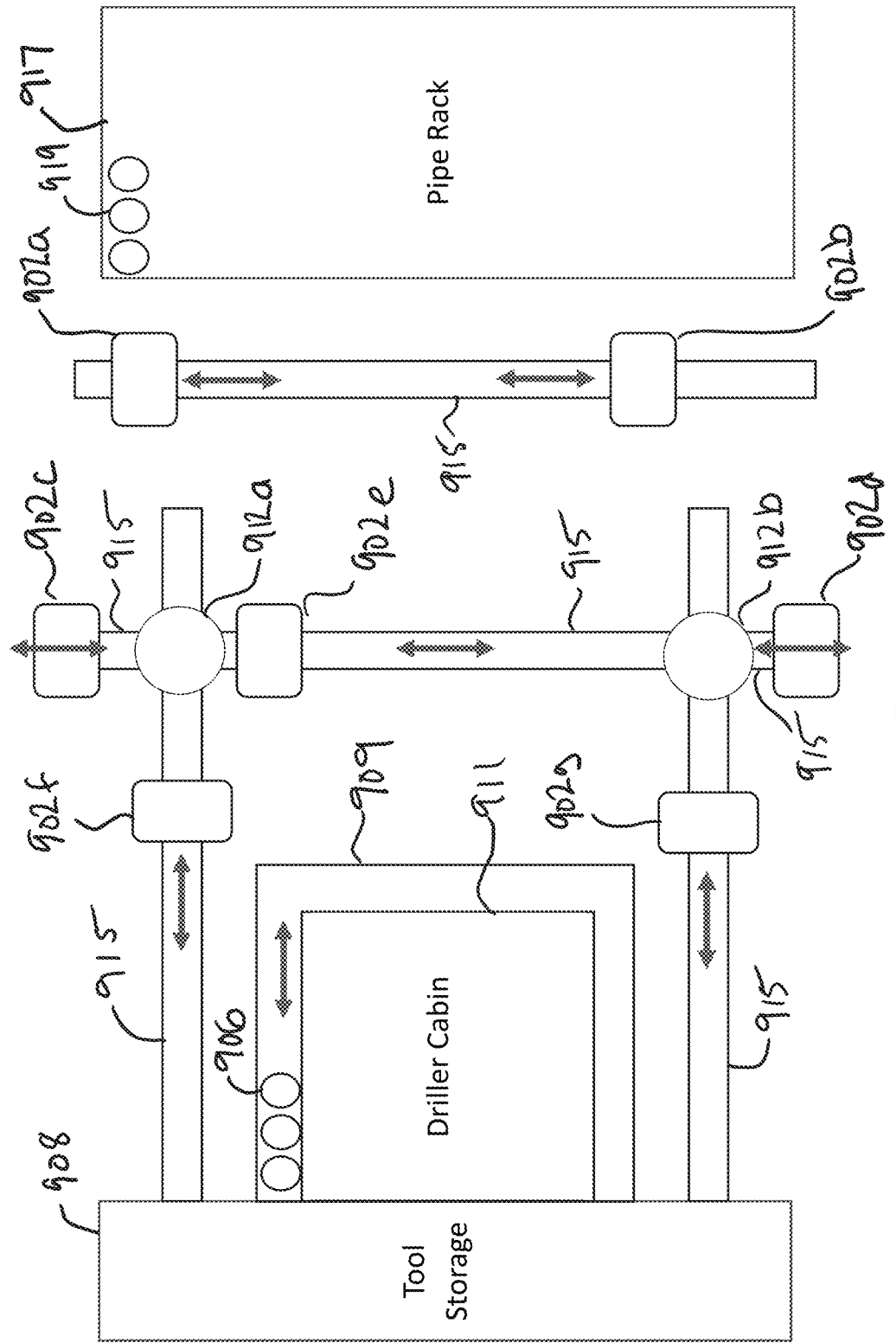
FIG. 9 is schematic top plan view of an example system layout to utilize multiple grafter robots to perform various tasks on the drill floor.

It is contemplated that in certain embodiments, a network of robots may be deployed on the drill floor to perform various tasks. Ideally, this would allow operations to be performed without workers being present on the drilling floor, which enhances safety. FIG. 9 shows one example where a plurality of robots 902a-g are provided to perform tasks related to main and auxiliary work centers 912a, 912b, which may be rotary tables in this particular example. The robots 902a-g may move along various tracks 915 positioned on the drill floor, in directions indicated by the arrows, to allow respective robots 902a-g to maneuver between locations for retrieving or replacing components and/or end effector tools, performing tasks at the work center(s), and the like.

The robots 902a-g may pass-off components to one another, such as the pipes, subs, BHA jewelry, mud bucket, slips, and/or bushings described in the operations above, or other like components. In particular, the methods described above and depicted in 3A-8 can be performed by multiple robots. For example, one robot may be utilized to obtain a small sub from a rack and pass the small sub to a second robot that places the sub at the work center.

In the example of FIG. 9, two robots 902a, 902b are provided adjacent to a pipe rack 917 and may be utilized to retrieve or replace pipes 919 from the pipe rack 917. The robots 902a, 902b may pass to or receive pipes 919 from one or more of robots 902c, 902d, 902e, which may be used to perform pipe installation or removal processes at the work centers 912a, 912b. In this example, the track 915 supporting the robots 902a, 902b runs parallel alongside the pipe rack 917 so that the robots 902a, 902b may move to various locations to obtain or replace a pipe 919 and to facilitate passing-off of pipes with the robots 902c-e working at the work centers 912a, 912b. However, in other embodiments, the robots 902a, 902b may perform the pipe installation/removal themselves at the work centers 912a, 912b in addition to retrieving/replacing pipes 919 at the pipe rack 917. Although two robots 902a, 902b are shown adjacent the pipe rack 917, any number of robots may be provided as necessary, including a single robot 902, if practicable. Although a single, one directional track 915 is shown for robots 902a-b, the track 915 may run in additional or alternative directions to allow for the operations required of the robots 902a-b. In addition, each of the robots 902a, 902b can be mounted for movement on its own track 915. It is further possible in the depicted embodiment that the robots 902a-b need not switch end effector tools since the main function is retrieving and/or replacing pipe 919. However, in other embodiments, a tool rack (not shown) may be provided adjacent to the robots 902a-b or at least their supporting track 915 to allow for tool changes, if necessary.

In the example of FIG. 9, robots 902c, 902d are provided to service respective work centers 912a, 912b. Each may provided on a respective track 915 (or in some embodiments, a common track) for movement between the respective work center 912a, 912b and an associated tool rack (not shown) or other location necessary for access by the robots 902c, 902d. In addition, in this example, a robot 902e is shown that is able to service both work centers 912a, 912b via a track 915 located therebetween. This robot 902e may be in addition to, or in place of, the two robots 902c, 902d. In addition, multiple robots 902 may be provided between the work centers 912a, 912b, which may be placed on multiple tracks. The robot 902e may retrieve end effector tools 906 from tool storage 908. In the particular embodiment shown in FIG. 9, the tool storage 908 includes a tool rack 909 disposed around at least a portion of a periphery of a driller cabin 911 adjacent to the track 915 supporting the robot 902e. However, other locations for tool storage 908 may be provided, as well. In an alternative embodiment, if any of the robots 902c-e is assigned a permanent single task (e.g., setting/removing slips), switching of an end effector tool for the particular robot may be unnecessary.

The example in FIG. 9 shows additional robots 902f, 902g provided for respectively servicing the work centers 912a, 912b on tracks running between the work centers 912a, 912b and the tool storage 908. These robots 902f, 902g may be provided in place of or in addition to the robots 902c-e described above. These robots 902f, 902g may also have access to the tool rack 909 at a periphery of the driller cabin 911. As before, in an alternative embodiment, if any of the robots 902f, 902g is assigned a permanent single task (e.g., setting/removing slips), switching of an end effector tool for the particular robot may be unnecessary.

FIG. 9 is an example layout of various robots 902a-g on the drilling floor with respect to various locations thereof. The number of robots 902 deployed, the particular tasks for which those robots may be assigned, the layout and shape of tracks 915 on the floor, the locations of the work centers 912a-b, pipe rack 917, tool storage 908, and any other areas requiring access by one or more of the robots 902 may be altered without departing from the concept of the invention. It should further be noted that while all robots 902a-g shown in FIG. 9 are movable with respect to the drill floor, there may be embodiments where one or more of the deployed robots remains stationary on the drill floor.

Figure 10:
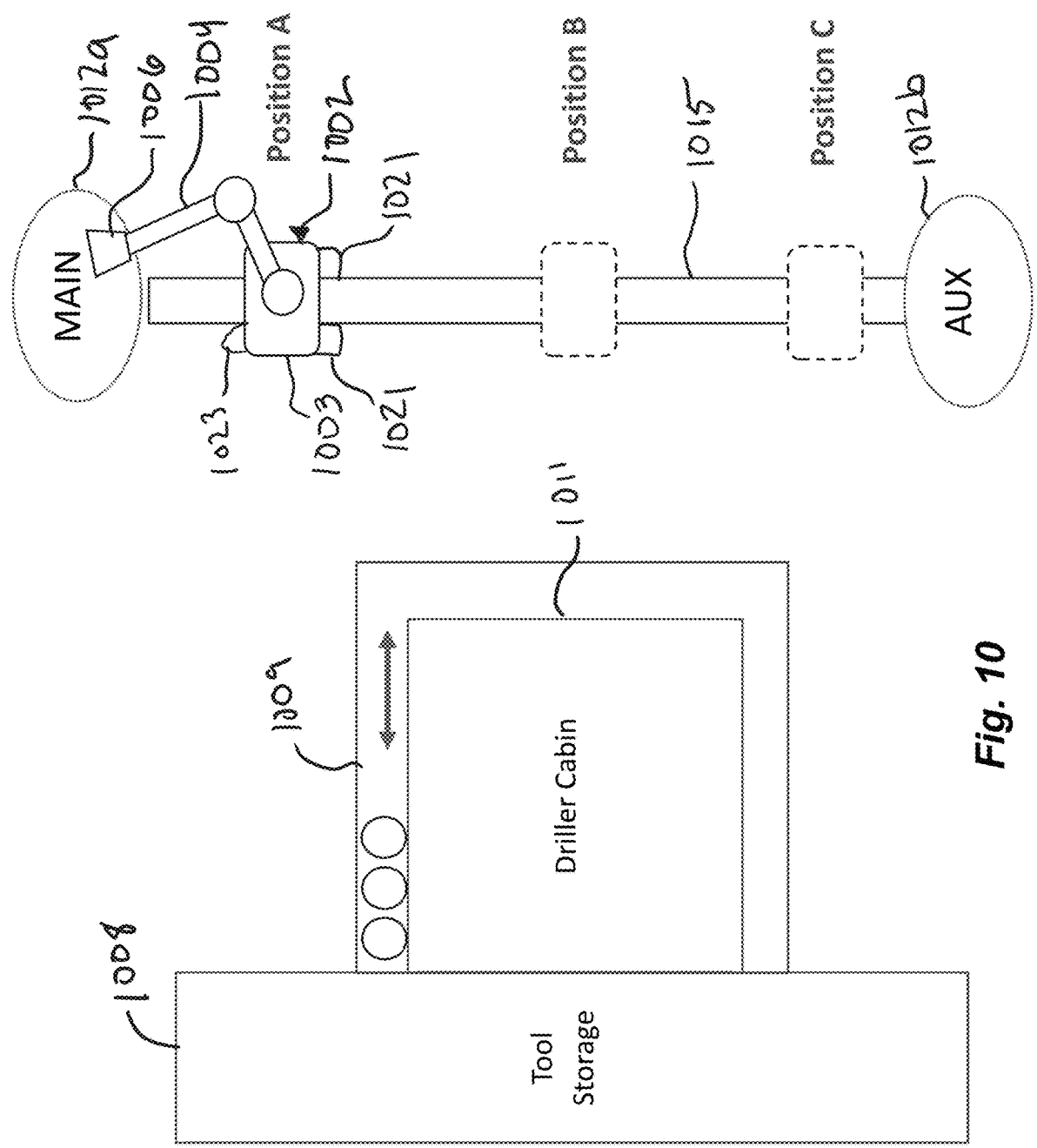
FIG. 10 is a schematic top plan view of an example robot and various service positions between two work centers on the drill floor of FIG. 9.

FIG. 10 provides a more detailed view of the robot 1002 movable between the two work centers 1012a, 1012b. For example, the base 1003 of the robot 1002 may couple to a track 1015 that may be a linear rail, although other types of tracks may be used as well. The track 1015 may be disposed on or in the deck (including a flush mount), or can be elevated above the deck (e.g., suspended or the like). The track 1015 may have any orientation and any shape as needed to move the robot 1002 between positions for performing all necessary operations. In FIG. 10, a position "A" is shown where the robot 1002 has access to the main work center 1012a. In position "B", the robot 1002 can access the tool rack 1009 on the periphery of the driller cabin 1011, or other portion of tool storage 1008, using the robot arm 1004 to obtain an end effector tool 1006. In position "C", the robot 1002 has access to the auxiliary work center 1012b. Any number of positions may be utilized along the track 1015 depending on the operations to be performed.

Different types of mechanisms may be used to move the robot 1002 along the track 1015, such as a rack and pinion actuator, a hydraulic actuator, a ball screw actuator, a friction drive, magnetic levitation, a pneumatic actuator, or the like, including combinations thereof. In addition, as the robot 1002 will be performing tasks on heavy equipment and potentially generating large torque loads, it is preferable that when the robot 1002 is in position to perform an operation, that the robot 1002 is latched or locked in place to avoid undesirable movements as a result of the operations being performed. For this purpose, one or more latching mechanisms 1021 may be provided to lock the robot 1002 down while operating at a designated position. The latching mechanism may be, for example, a frictional latch, a shot pin or lock pin, a clamp, or the like, including combinations thereof, which may engage the track 1015, the deck floor, and/or some other structure for preventing movement of the robot 1002.

It may also be important to be able to accurately monitor a position of the robot 1002 on the track. For this purpose, an indexing device 1023 may be provided. The indexing device 1023 may include a tapered pin, electronic position sensor, a rotary or linear encoder, or the like, or combinations thereof. Such an indexing device 1023 may be configured to move with the robot 1002, and/or may be located at a motor or other device (not shown) for moving the robot 1002 along the track 1015.

Figure 11:
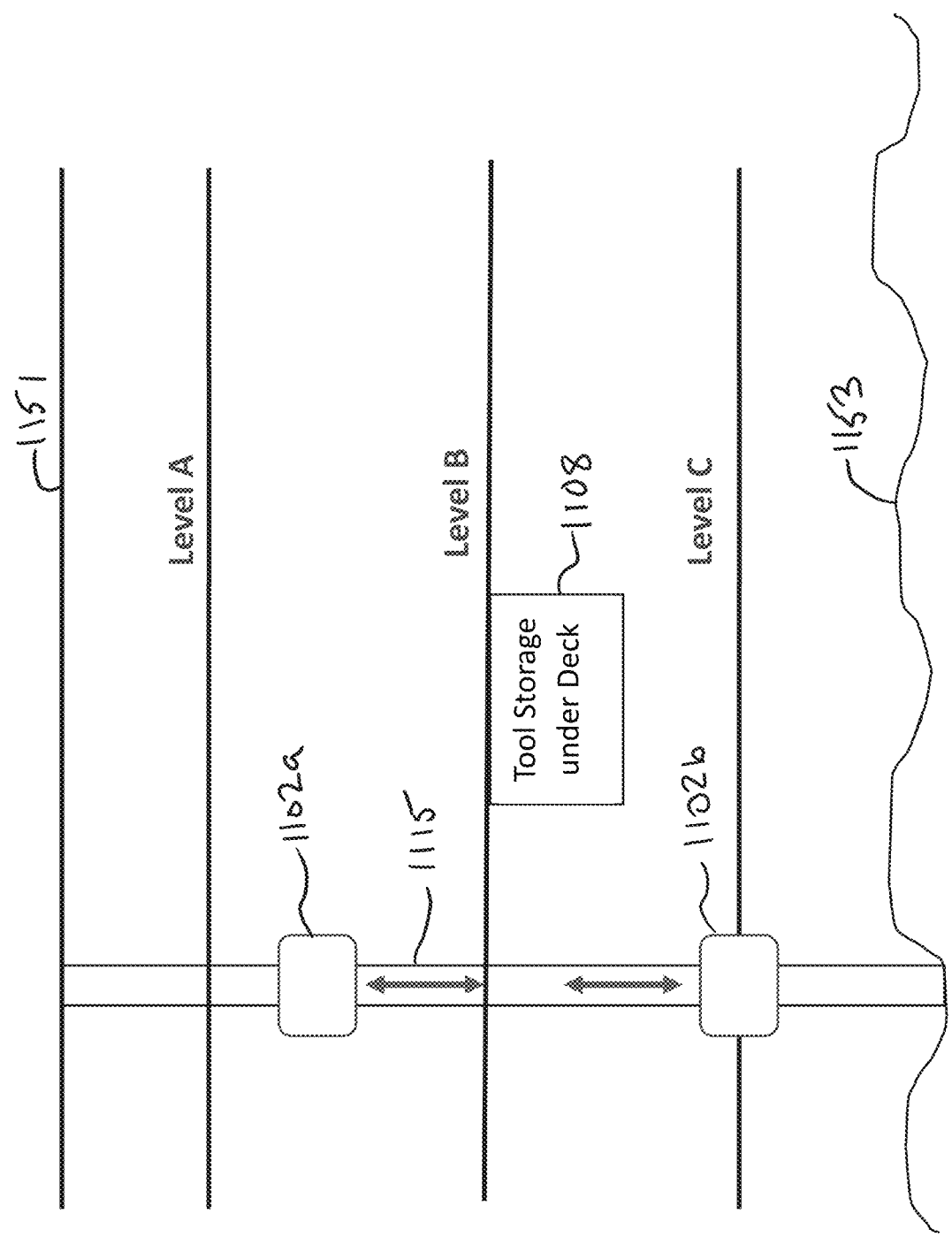
FIG. 11 is a schematic side elevation view of an example multi-level rig utilizing a system with one or more grafter robots vertically movable among the levels.

So far, the system has been shown and described with tracks lying in the drill floor plane and robots moving accordingly. However, in some embodiments, tracks may extend vertically such that the associated robot(s) may move vertically to access various locations. FIG. 11 shows one example with a rig having multiple vertical levels between a top surface 1151 and a bottom surface 1153, such as a water line, rig substructure, ground surface, or the like. A vertically extending track 1115 is provided along which two robots 1102a, 1102b are configured for movement. Items like tool storage 1108 or the like may also be mounted vertically to save space and allow for access by the vertically moving robot(s) 1102a, 1102b. In other embodiments, tracks may be provided to allow for combinations of movement in the x, y, and z directions on the rig.

The network of robots shown and described above may be centrally and remotely controlled, such as via control system 140 shown in FIG. 2. The control programming preferably is configured to coordinate motion of the various robots so as to avoid collisions with each other and with any personnel that may be present on the drilling floor. Such collision avoidance can be performed in accordance with techniques such as those disclosed in U.S. Pat. Nos. 10,402,662 and 11,763,653, the contents of each of which are incorporated by reference herein.

It is further contemplated that operation of the robot 102 or network of robots 102 may be controlled and/or monitored remotely, possibly programmed offline, and have programming replicated. For example, the robot 102, robot controller 142, and/or control system 140 may upload information data (e.g., sensor data related to the robot 102, environmental conditions, or the like, operational settings, historical operational data, or the like) to monitoring server(s) or the like, which may be remotely located from the drill floor or the rig. Such uploads may occur over wired or wireless wide or local area networks (e.g., the Internet, Wi-Fi, cellular, USB, or the like). The uploaded data may be used by computerized or manual operators to monitor and/or operate the robot(s) 102 on the rig. Changes may be made and downloaded back to the robot 102, robot controller 142, and/or control system 140 to change operations settings, instructions, or the like. Such changes may also be performed offline and downloaded to the appropriate rig components when connection with the network is re-established. Such data may also be used to create a "digital twin" or the robot 102, network of robots 102, or overall rig system, which may be copied to other robots 102 or rigs, or manipulated for return of data changes to the same robots 102 or rigs. It should be noted that in some embodiments, the control system 140 and/or the robot controller 142 may be remotely located from the robot 102 and can perform many of the operations described above.

Those skilled in the art will recognize that boundaries between the above-described operations are merely illustrative. The multiple operations may be combined into a single operation, a single operation may be distributed in additional operations and operations may be executed at least partially overlapping in time. Further, alternative embodiments may include multiple instances of a particular operation, and the order of operations may be altered in various other embodiments.

While specific and distinct embodiments have been shown in the drawings, various individual elements or combinations of elements from the different embodiments may be combined with one another while in keeping with the spirit and scope of the invention. Thus, an individual feature described herein only with respect to one embodiment should not be construed as being incompatible with other embodiments described herein or otherwise encompassed by the invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined herein.

We claim:

1. A system for performing one or more operations on a work center disposed on a drill rig floor, the system comprising:
    (a) a robotic system having:
        a base disposed on a track for movement thereon,
        a robot arm supported on the base, and
        one or more end effector tools selectively attachable to an end of the robot arm; and
    (b) a control system having a robot controller in communication with the robotic system, the robot controller being configured to:
        (1) command the robotic system to enter a mode for performing a selected operation,
        (2) command the robot arm to engage one of the one or more end effector tools related to the selected operation from a tool storage,
        (3) command the robotic system to move along the track to a position adjacent to the work center, and
        (4) command the robotic system to perform the selected operation at the work center using the robot arm and the engaged end effector tool.

2. The system of claim 1, wherein the engaged end effector tool is a small sub end effector.

3. The system of claim 2, wherein the selected operation is a tail in operation, the robot controller being further configured to:
    (5) command the robotic system to engage the small sub end effector to a stand,
    (6) command the robotic system to tail in the stand to the work center,
    (7) command the robotic system to position the stand for stabbing, and
    (8) command the robotic system to disengage the small sub end effector from the stand.

4. The system of claim 2, wherein the selected operation is a tail out operation, the robot controller being further configured to:
    (5) command the robotic system to engage the small sub end effector to a stand,
    (6) command the robotic system to tail out the stand from the work center to a setback position, and
    (7) command the robotic system to disengage the small sub end effector from the stand.

5. The system of claim 2, wherein the selected operation is a small sub installation operation, the robot controller being further configured to:
    (5) prior to the robotic system moving to the position adjacent to the work center, command the robotic system to engage the small sub end effector to a small sub and lift the small sub,
    (6) after the robotic system has moved to the position adjacent to the work center, command the robotic system to enter a float mode and lower the small sub while spinning the small sub in a clockwise direction, and
    (7) command the robotic system to disengage the small sub end effector from the small sub.

6. The system of claim 2, wherein the selected operation is a small sub removal operation, the robot controller being further configured to:
    (5) command the robotic system to engage the small sub end effector to a small sub,
    (6) command the robotic system to enter a float mode and raise the small sub while spinning the small sub in a counterclockwise direction,
    (7) command the robotic system to move along the track to a small sub storage location, and
    (8) command the robotic system to disengage the small sub end effector from the small sub.

7. The system of claim 1, wherein the engaged end effector tool is a BHA jewelry end effector.

8. The system of claim 7, wherein the selected operation is a BHA jewelry installation operation, the robot controller being further configured to:
    (5) prior to the robotic system moving to the position adjacent to the work center, command the robotic system to engage the BHA jewelry end effector to BHA jewelry and lift the BHA jewelry,
    (6) after the robotic system has moved to the position adjacent to the work center, command the robotic system to enter a float mode and lower the BHA jewelry while spinning the BHA jewelry in a clockwise direction, and
    (7) command the robotic system to disengage the BHA jewelry end effector from the BHA jewelry.

9. The system of claim 7, wherein the selected operation is a BHA jewelry removal operation, the robot controller being further configured to:
    (5) command the robotic system to engage the BHA jewelry end effector to BHA jewelry,
    (6) command the robotic system to enter a float mode and raise the BHA jewelry while spinning the BHA jewelry in a counterclockwise direction,
    (7) command the robotic system to move along the track to a BHA jewelry storage location, and
    (8) command the robotic system to disengage the BHA jewelry end effector from the BHA jewelry.

10. The system of claim 1, wherein the engaged end effector tool is a mud bucket end effector.

11. The system of claim 10, wherein the selected operation is a mud bucket installation operation, the robot controller being further configured to:
(5) command the robotic system to engage the mud bucket end effector to a pipe and remain with the pipe while the pipe is raised to direct mud through a mud bucket, and
(6) command the robotic system to disengage the mud bucket end effector from the pipe.

12. The system of claim 11, wherein the robot controller is configured to command the robotic system to repeat (5) and (6) until tripping is complete.

13. The system of claim 1, wherein the engaged end effector tool is a slips end effector.

14. The system of claim 13, wherein the selected operation is a slips usage operation, the robot controller being further configured to:
(5) command the robotic system to engage the slips end effector to a pipe,
(6) command the robotic system to enter a float mode while a drill string is lowered,
(7) command the robotic system to move to a low crouch position to be clear of other equipment as another stand is made or broken from the drill string, and
(8) command the robotic system to disengage the slips end effector from the pipe.

15. The system of claim 14, wherein the robot controller is configured to command the robotic system to repeat (5) through (8) until tripping is complete.

16. The system of claim 1, wherein the engaged end effector tool is a bushing end effector.

17. The system of claim 16, wherein the selected operation is a bushing manipulation operation, the work center including a rotary table, the robot controller being further configured to:
(5) command the robotic system to engage the bushing end effector to a bushing,
(6) command the robotic system to lift the bushing clear of the rotary table and move to a standby position,
(7) after a bit or tool has passed through the rotary table, command the robotic system to return the bushing to the rotary table, and
(8) command the robotic system to disengage the bushing end effector from the bushing.

18. The system of claim 1, wherein the track extends vertically.

19. The system of claim 18, wherein the tool storage is located on different vertical level of the drill rig than the work center.

20. The system of claim 1, wherein the robot controller is further configured to command the robotic system to return the engaged end effector tool to the tool storage.

21. A system for performing one or more operations on a work center disposed on a drill rig floor, the system comprising:
(a) a plurality of robotic systems each having:
a base disposed on a track for movement thereon,
a robot arm supported on the base, and
one or more end effector tools selectively attachable to an end of the robot arm; and
(b) a control system having a robot controller in communication with each of the plurality of robotic systems, the robot controller being configured to:
(1) command at least a subset of the plurality of robotic systems to enter a mode for performing a selected operation,
(2) command at least one robot arm from the at least a subset of the plurality of robotic systems to engage one of the one or more end effector tools related to the selected operation from a tool storage,
(3) command at least one of the at least a subset of the plurality of robotic systems to move along its respective track to a position adjacent to the work center, and
(4) command the at least one of the at least a subset of the plurality of robotic systems to perform the selected operation at the work center using the at least one robot arm and the engaged end effector tool.

22. The system of claim 21, wherein the robot controller is further configured to command another robotic system of the at least a subset of the plurality of robotic systems to provide a component to the at least one robotic system performing the selected operation at the work center.

23. The system of claim 22, wherein the component is a pipe retrieved from a pipe rack.

24. The system of claim 1, wherein the robot controller is further configured to command the robot arm to disengage the one of the one or more end effector tools.

25. The system of claim 1, wherein the robotic system includes a sensor configured to obtain information for verifying correct selection of at least one of:
(i) the one of the one or more end effector tools, or
(ii) a component for use in performing the selected operation.

26. The system of claim 25, wherein the sensor is an RFID reader and the one or more end effector tools each include a unique RFID tag,
wherein prior to the robot arm engaging the one of the one or more end effector tools related to the selected operation, the robotic system is configured to use the RFID reader to read the RFID tag on the one of the one or more end effector tools.

27. The system of claim 1, wherein the robotic system includes at least one optical sensor and the robot controller is configured to command the robotic system to visually inspect one or more components on the drill rig floor using the at least one optical sensor.

28. The system of claim 1, wherein the control system is located remotely from the robotic system.

29. The system of claim 28, wherein the control system is configured to enable an operator to change operational settings for the robotic system when the control system is disconnected from the robotic system, and to download the changed operational settings to the robotic system when the control system is re-connected to the robotic system.

30. The system of claim 28, wherein the control system is configured to apply operational settings assigned to the robotic system to a second robotic system that is remotely located from the control system.

31. The system of claim 1, wherein the control system includes programming to avoid collisions of the robotic system with at least one of other robotic systems on the drill rig floor or personnel on the drill rig floor.

* * * * *